US011698642B2

(12) United States Patent
Eshima

(10) Patent No.: US 11,698,642 B2
(45) Date of Patent: Jul. 11, 2023

(54) INFORMATION PROCESSING APPARATUS, MOBILE OBJECT, CONTROL SYSTEM, AND INFORMATION PROCESSING METHOD

(71) Applicant: SONY CORPORATION, Tokyo (JP)

(72) Inventor: Masashi Eshima, Chiba (JP)

(73) Assignee: SONY CORPORATION, Tokyo (JP)

( * ) Notice: Subject to any disclaimer, the term of this patent is extended or adjusted under 35 U.S.C. 154(b) by 284 days.

(21) Appl. No.: 16/768,875

(22) PCT Filed: Nov. 6, 2018

(86) PCT No.: PCT/JP2018/041145
§ 371 (c)(1),
(2) Date: Jun. 1, 2020

(87) PCT Pub. No.: WO2019/116784
PCT Pub. Date: Jun. 20, 2019

(65) Prior Publication Data
US 2021/0141386 A1 May 13, 2021

(30) Foreign Application Priority Data
Dec. 12, 2017 (JP) ................................. 2017-237534

(51) Int. Cl.
*G05D 1/02* (2020.01)
*G06T 7/73* (2017.01)
*G01C 21/16* (2006.01)

(52) U.S. Cl.
CPC ....... *G05D 1/0246* (2013.01); *G01C 21/1656* (2020.08); *G05D 1/0274* (2013.01);
(Continued)

(58) Field of Classification Search
CPC ...... G05D 1/0246; G05D 1/0274; G06T 7/73; G01C 21/1656
See application file for complete search history.

(56) References Cited

U.S. PATENT DOCUMENTS 6,227,496 B1 * 5/2001 Yoshikawa ............ B64G 1/288
244/171
9,587,948 B2 * 3/2017 Schuller .................... G06T 7/70
(Continued)

FOREIGN PATENT DOCUMENTS

CN 107797549 A 3/2018
EP 3291134 A1 3/2018
(Continued)

OTHER PUBLICATIONS

Extended European Search Report of EP Application No. 18889655.9 dated Jan. 11, 2021, 07 pages.
(Continued)

*Primary Examiner* — Luis A Martinez Borrero
(74) *Attorney, Agent, or Firm* — Chip Law Group

(57) ABSTRACT

There is provided an information processing apparatus that includes an information acquisition unit and a control prediction unit. The information acquisition unit acquires information regarding a location and a posture of a first mobile object that includes a sensing device. The control prediction unit predicts control performed with respect to the sensing device, on the basis of the information regarding the location and the posture and map information, the information regarding the location and the posture being acquired by the information acquisition unit.

16 Claims, 9 Drawing Sheets

(52) U.S. Cl.
CPC ....... *G06T 7/73* (2017.01); *G05D 2201/0213* (2013.01); *G06T 2207/30252* (2013.01)

(56) References Cited

U.S. PATENT DOCUMENTS

| | | | |
|---|---|---|---|
| 9,875,579 B2* | 1/2018 | Menozzi | G01C 21/1656 |
| 10,373,321 B2* | 8/2019 | Lee | H02S 20/32 |
| 11,164,264 B2* | 11/2021 | Shalev-Shwartz | B62D 15/025 |
| 2009/0326816 A1* | 12/2009 | Park | G01S 3/7864 |
| | | | 701/501 |
| 2014/0300686 A1* | 10/2014 | Campbell | G06T 7/248 |
| | | | 348/36 |
| 2015/0347840 A1* | 12/2015 | Iida | G06T 7/593 |
| | | | 382/103 |
| 2016/0055671 A1* | 2/2016 | Menozzi | G01S 5/163 |
| | | | 701/300 |
| 2016/0265919 A1* | 9/2016 | Schuller | G05D 1/0234 |
| 2016/0379365 A1* | 12/2016 | Sasaki | G06T 7/80 |
| | | | 382/103 |
| 2017/0030722 A1* | 2/2017 | Kojo | G01S 19/47 |
| 2018/0060675 A1 | 3/2018 | Ji et al. | |
| 2018/0284802 A1* | 10/2018 | Tsai | G01C 21/165 |
| 2018/0307245 A1* | 10/2018 | Khawaja | B60W 30/00 |
| 2018/0373265 A1* | 12/2018 | Ueda | G05D 1/024 |
| 2019/0295179 A1* | 9/2019 | Shalev-Shwartz | G07C 5/02 |
| 2019/0329768 A1* | 10/2019 | Shalev-Shwartz | G06V 20/56 |
| 2020/0166945 A1* | 5/2020 | Kim | G01C 21/3889 |
| 2020/0356108 A1* | 11/2020 | Toma | G08G 1/04 |
| 2021/0110484 A1* | 4/2021 | Shalev-Shwartz | B60W 10/18 |
| 2022/0260722 A1* | 8/2022 | Wang | G01S 7/481 |

FOREIGN PATENT DOCUMENTS

| | | |
|---|---|---|
| JP | 64-046111 A | 2/1989 |
| JP | 06-253208 A | 9/1994 |
| JP | 08-240833 A | 9/1996 |
| JP | 2005-315746 A | 11/2005 |
| JP | 2006-222844 A | 8/2006 |
| JP | 2006-303885 A | 11/2006 |
| JP | 2015-228597 A | 12/2015 |
| JP | 2016-223846 A | 12/2016 |
| JP | 2017009555 A | 1/2017 |
| JP | 2017-100676 A | 6/2017 |
| JP | 2018-37061 A | 3/2018 |
| JP | 2018-037061 A | 3/2018 |
| JP | 64-46111 B2 | 12/2018 |
| KR | 10-2018-0025591 A | 3/2018 |
| WO | 2011/099049 A1 | 8/2011 |
| WO | 2016/098050 A1 | 6/2016 |

OTHER PUBLICATIONS

International Search Report and Written Opinion of PCT Application No. PCT/JP2018/041145, dated Feb. 12, 2019, 13 pages of ISRWO.

Office Action for IN Patent Application No. 202027023473 dated Apr. 5, 2022, 07 pages of Office Action.

Office Action for JP Patent Application No. 2019-558969, dated Jul. 5, 2022, 08 pages of English Translation and 07 pages of Office Action.

* cited by examiner

INFORMATION PROCESSING APPARATUS, MOBILE OBJECT, CONTROL SYSTEM, AND INFORMATION PROCESSING METHOD

CROSS REFERENCE TO RELATED APPLICATIONS

This application is a U.S. National Phase of International Patent Application No. PCT/JP2018/041145 filed on Nov. 6, 2018, which claims priority benefit of Japanese Patent Application No. JP 2017-237534 filed in the Japan Patent Office on Dec. 12, 2017. Each of the above-referenced applications is hereby incorporated herein by reference in its entirety.

TECHNICAL FIELD

The present technology relates to an information processing apparatus, a mobile object, control system, an information processing method, and a program, and in particular to an information processing apparatus, a mobile object, a system, an information processing method, and a program that are optimal for obtaining a proper image upon estimating a self-location of the mobile object.

BACKGROUND ART

In the past, a method for estimating a self-location of an autonomously behaving mobile object has been proposed, the method including, for example, extracting a plurality of characteristic points (also referred to as landmarks) from an image of the surroundings of the mobile object that is captured by a camera; and estimating three-dimensional positions of the plurality of characteristic points (for example, refer to Patent Literature 1).

CITATION LIST

Patent Literature

Patent Literature 1: Japanese Patent Application Laid-open No. 2005-315746

DISCLOSURE OF INVENTION

Technical Problem

When a self-location is estimated using an image, sight of a landmark may be lost or the landmark may be falsely recognized due to various disturbance factors existing in the surrounding environment, and this may result in there being a decrease in the accuracy in estimating a self-location.

In view of the circumstances described above, it is an object of the present technology to provide an information processing apparatus, a mobile object, a control system, an information processing method, and a program that make it possible to reduce an impact of a disturbance factor.

Solution to Problem

In order to achieve the object described above, an information processing apparatus according to the present technology includes an information acquisition unit and a control prediction unit.

The information acquisition unit acquires information regarding a location and a posture of a first mobile object that includes a sensing device.

The control prediction unit predicts control performed with respect to the sensing device, on the basis of the information regarding the location and the posture and map information, the information regarding the location and the posture being acquired by the information acquisition unit.

According to such a configuration, on the basis of information regarding a location and a posture of the first mobile object at a time T and map information, control that is performed with respect to the sensing device and is suitable for the mobile object at T+N, that is, N seconds after the time T, is predicted. Since control with respect to the sensing device is performed in the mobile object at T+N, on the basis of information regarding the control prediction, it is possible to perform control without a time lag.

The sensing device may include an image-capturing device. The information processing apparatus may further include a unit for predicting a location and a posture of a mobile object that predicts the location and the posture of the first mobile object on the basis of the information regarding the location and the posture, the information regarding the location and the posture being acquired by the information acquisition unit; and a unit for predicting a position of a disturbance factor that predicts a position of a disturbance factor in an image captured by the image-capturing device, on the basis of the map information and a result of the prediction performed by the unit for predicting a location and a posture of a mobile object. On the basis of a result of the prediction performed by the unit for predicting a position of a disturbance factor, the control prediction unit may predict control performed with respect to the image-capturing device.

According to such a configuration, on the basis of the information regarding a location and a posture of the first mobile object at a time T and the map information, a position of a disturbance factor in an image predicted to be captured by the image-capturing device at T+N, that is, N seconds after the time T, is predicted. Then, control performed with respect to the image-capturing device such that an image in which an impact due to the disturbance factor is reduced is obtained, is predicted on the basis of a result of the prediction of the position of the disturbance factor.

In the first mobile object, a control condition for the image-capturing device capturing an image of the mobile object at T+N, is set on the basis of information regarding the control prediction, and this results in being able to obtain, at T+N and without a time lag, an image that is suitable for a state of the mobile object at T+N and in which an impact due to a disturbance factor is reduced.

The control prediction unit may predict an exposure control performed with respect to the image-capturing device.

The control prediction unit may predict a photometry-region control performed with respect to the image-capturing device.

The sensing device may include an image-capturing device. The first mobile object may include a self-location estimation system that estimates the location and the posture of the first mobile object using a characteristic point that is extracted from image information from the image-capturing device. The information processing apparatus may further include a unit for predicting a location and a posture of a mobile object that predicts the location and the posture of the first mobile object on the basis of the information regarding the location and the posture, the information regarding the location and the posture being acquired by the information acquisition unit; and a unit for predicting a position of a disturbance factor that predicts a position of a disturbance factor in an image captured by the image-capturing device, on the basis of the map information and a result of the prediction performed by the unit for predicting a location and a posture of a mobile object. On the basis of a result of the prediction performed by the unit for predicting a position of a disturbance factor, the control prediction unit may predict control performed with respect to the self-location estimation system.

According to such a configuration, on the basis of the information regarding a location and a posture of the first mobile object at a time T and the map information, a position of a disturbance factor in an image predicted to be captured by the image-capturing device at T+N, that is, N seconds after the time T, is predicted. Then, control performed with respect to the self-location estimation system is predicted on the basis of a result of the prediction of the position of the disturbance factor, such that an impact due to the disturbance factor is reduced.

In the first mobile object, control performed at T+N with respect to the self-location estimation system is set on the basis of information regarding the control prediction. This makes it possible to perform processing of estimating a self-location and a posture at T+N, using, for example, information regarding an image that is suitable for a state of the mobile object at T+N and in which an impact due to a disturbance factor is reduced. This results in an improvement in the estimation accuracy.

On the basis of the result of the prediction performed by the unit for predicting a position of a disturbance factor, the control prediction unit may predict a region in which extraction of the characteristic point in the image is not performed in the self-location estimation system.

The sensing device may include the image-capturing device and a mobile-object-state detection sensor that detects a state of the first mobile object. The first mobile object may include the self-location estimation system that estimates the location and the posture of the first mobile object using at least one of the image information, or mobile-object-state information from the mobile-object-state detection sensor. On the basis of the result of the prediction performed by the unit for predicting a position of a disturbance factor, the control prediction unit may predict how the image information and the mobile-object-state information are respectively weighted, the image information and the mobile-object-state information being used when the location and the posture of the first mobile object are estimated in the self-location estimation system.

The sensing device may include a plurality of the image-capturing devices. On the basis of the result of the prediction performed by the unit for predicting a position of a disturbance factor, the control prediction unit may predict how respective pieces of image information from the plurality of the image-capturing devices are weighted, the respective pieces of image information being used when the location and the posture of the first mobile object are estimated in the self-location estimation system.

On the basis of the result of the prediction performed by the unit for predicting a position of a disturbance factor, the control prediction unit may predict control performed with respect to the image-capturing device.

The disturbance factor may be the sun, and, on the basis of the map information, the result of the prediction performed by the unit for predicting a location and a posture of a mobile object, and sun position information, the unit for predicting a position of a disturbance factor may predict a position of the sun in the image captured by the image-capturing device.

The disturbance factor may be a tunnel, and, on the basis of the map information and the result of the prediction performed by the unit for predicting a location and a posture of a mobile object, the unit for predicting a position of a disturbance factor may predict a position of the tunnel in the image captured by the image-capturing device.

The disturbance factor may be a shadow of a structure, and, on the basis of the map information, the result of the prediction performed by the unit for predicting a location and a posture of a mobile object, and sun position information, the unit for predicting a position of a disturbance factor may predict a position of the shadow created due to the structure in the image captured by the image-capturing device.

The information acquisition unit may acquire information regarding a location and a posture of a second mobile object that includes a sensing device and is different from the first mobile object. The control prediction unit may set, to be prediction of control performed with respect to the sensing device of the second mobile object, the prediction of the control performed with respect to the sensing device of the first mobile object, the prediction of the control performed with respect to the sensing device of the first mobile object being performed by the control prediction unit on the basis of the information regarding the location and the posture of the first mobile object and the map information, the information regarding the location and the posture of the first mobile object being acquired by the information acquisition unit.

In order to achieve the object described above, a mobile object according to the present technology includes a sensing device and an acquisition unit.

The acquisition unit acquires information regarding a self-location and a posture of the mobile object.

The sensing device is controlled according to control prediction information regarding prediction of control performed with respect to the sensing device, the control performed with respect to the sensing device being predicted on the basis of the information regarding the self-location and the posture and map information, the information regarding the self-location and the posture being acquired by the acquisition unit.

In order to achieve the object described above, a control system according to the present technology includes a mobile object, an information acquisition unit, a control prediction unit, and a control unit.

The mobile object includes a sensing device.

The information acquisition unit acquires information regarding a location and a posture of the mobile object.

The control prediction unit predicts control performed with respect to the sensing device, on the basis of the information regarding the location and the posture and map information, the information regarding the location and the posture being acquired by the information acquisition unit.

The control unit performs the control with respect to the sensing device on the basis of control prediction information regarding the control prediction performed by the control prediction unit.

In order to achieve the object described above, an information processing method according to the present technology includes acquiring information regarding a location and a posture of a mobile object that includes a sensing device; and predicting control performed with respect to the sensing device, on the basis of the information regarding the location and the posture and map information.

In order to achieve the object described above, a program according to the present technology causes an information processing apparatus to perform a process including acquiring information regarding a location and a posture of a mobile object that includes a sensing device; and predicting control performed with respect to the sensing device, on the basis of the information regarding the location and the posture and map information.

Advantageous Effects of Invention

As described above, according to the present technology, it is possible to provide an information processing apparatus, a mobile object, a system, an information processing method, and a program that make it possible to reduce an impact of a disturbance factor.

Note that the effect described here is not necessarily limitative and any of the effects described in the present disclosure may be provided.

MODE(S) FOR CARRYING OUT THE INVENTION

Embodiments for carrying out the present technology will now be described below.

According to the present technology, on the basis of information regarding a self-location and a posture of a mobile object at a time T and map information, a location of the mobile object at T+N (N>0), that is, N seconds after the time T is predicted, and control performed at T+N with respect to a sensing device included in the mobile object, is predicted.

In first to third embodiments described below, the descriptions are made taking a vehicle such as an automobile as an example of a first mobile object, and taking a camera (an image-capturing device) and a vehicle-state detection sensor as an example of a sensing device.

Note that, here, the descriptions are made using an automobile as a mobile object, but is not limitative. Examples of the mobile object include a bicycle, a motorcycle, an unmanned aerial vehicle (UAV) such as a drone, and various robots.

The vehicle includes a camera, a vehicle-state detection sensor, and a self-location estimation system that is used to assist a vehicle in traveling with automated driving.

In the first and third embodiments described below, on the basis of information regarding a self-location and a posture of a vehicle at a time T and map information, a location of the vehicle at T+N, that is, N seconds after the time T is predicted.

Next, on the basis of information regarding the mobile-object-location prediction, the map information, and information regarding a date and time/weather, a position of a disturbance factor in an image predicted to be captured at T+N is predicted.

Next, control performed with respect to the camera and control performed with respect to the self-location estimation system are predicted on the basis of a result of the prediction of the position of the disturbance factor. The descriptions are made taking the sun as an example of the disturbance factor in the first embodiment, and taking a shadow of a structure such as a building as an example of the disturbance factor in the third embodiment.

Further, in the second embodiment, on the basis of information regarding a self-location of a mobile object at a time T and map information, a location and a posture of the vehicle at T+N, that is, N seconds after the time T are predicted.

Next, on the basis of information regarding the mobile-object-location prediction and the map information, a position of a tunnel, a disturbance factor, in an image predicted to be captured at T+N is predicted.

Next, control performed with respect to the camera and control performed with respect to the self-location estimation system are predicted on the basis of a result of the prediction of the position of the disturbance factor.

The respective embodiments are described below in detail.

First Embodiment

[Example of Configuration of Control System]

Figure 1:
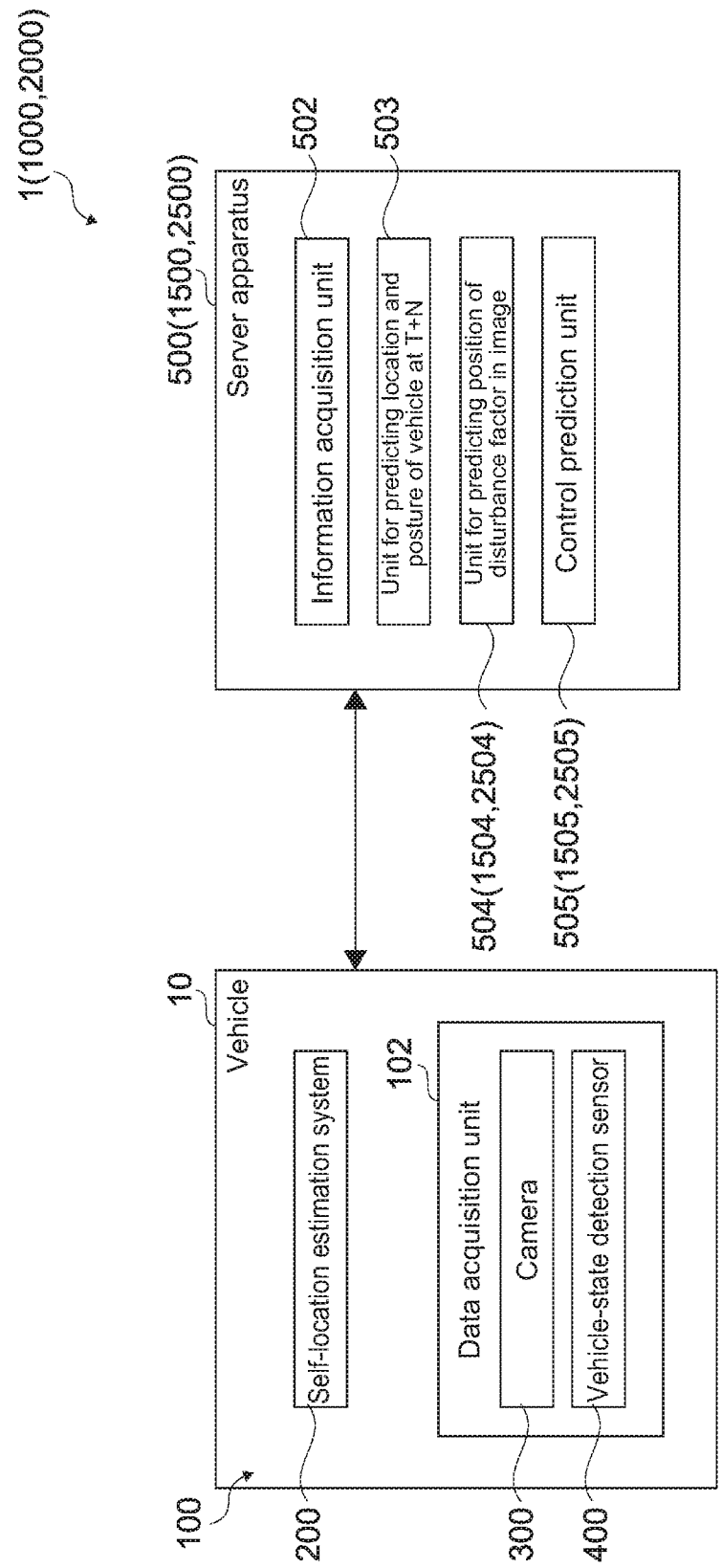
FIG. 1 schematically illustrates a sensing-device control system according to a first embodiment of the present technology.

FIG. 1 is a block diagram of an example of a schematic functional configuration of a control system 1 for a sensing device to which the present technology is applicable. Here, only a primary configuration is described, and a detailed configuration will be described later using FIG. 2 and the figures subsequent to FIG. 2.

The control system 1 includes a vehicle control system 100 that is installed in a vehicle 10 that is a mobile object, and a server apparatus 500 that serves as an information processing apparatus. The vehicle control system 100 and the server apparatus 500 are capable of communicating with each other, for example, through a wireless communication network.

Note that an example of providing the server apparatus 500 serving as an information processing apparatus outside of the vehicle 10 is described in the present embodiment, but the server apparatus 500 may be installed in the vehicle 10.

The vehicle control system 100 includes a self-location estimation system 200 and a data acquisition unit 102.

The data acquisition unit 102 includes a camera 300 and a vehicle-state detection sensor 400 that serve as a sensing device. The camera 300 is used to capture an image of the outside of the vehicle 10, and a plurality of cameras 300 is installed in the vehicle 10.

In the self-location estimation system 200, a self-location and a posture of the vehicle 10 that are necessary to perform automated driving are estimated. In the self-location estimation system 200, the self-location and the posture of the vehicle 10 are estimated using information from the sensing device, such as image information regarding an image captured by the camera 300, and vehicle-state detection information from the vehicle-state detection sensor 400.

In the self-location estimation system 200, when the self-location and the posture of the vehicle 10 are estimated on the basis of image information from the camera 300, the location is estimated on the basis of a result of tracking a characteristic point (a landmark) in the image.

The server apparatus 500 includes an information acquisition unit 502, a unit 503 for predicting a location and a posture of a vehicle at T+N, a unit 504 for predicting a position of a disturbance factor in an image, and a control prediction unit 505.

In the data acquisition unit 102 of the vehicle 10, information regarding the vehicle 10 at a time T is acquired using the camera 300 and the vehicle-state detection sensor 400. The information regarding the vehicle 10 at the time T is transmitted to the server apparatus 500.

The information acquisition unit 502 of the server apparatus 500 acquires the information regarding the vehicle 10 at the time T that is transmitted from the vehicle control system 100.

On the basis of the information regarding the vehicle 10 at the time T that is acquired by the information acquisition unit 502, the unit 503 for predicting a location and a posture of a vehicle at T+N, which is a unit for predicting a self-location and a posture of a mobile object, predicts a self-location and a posture of the vehicle 10 at T+N, that is, N seconds after the time T.

In the present embodiment, the unit 504 for predicting a position of a disturbance factor in an image predicts a position of the sun, a disturbance factor, in an image.

The unit 504 for predicting a position of a disturbance factor (the sun) in an image (hereinafter referred to as a unit for predicting a position of the sun in an image) predicts a position of the sun in an image captured at T+N, on the basis of information regarding the predicted self-location and posture of the vehicle 10 at T+N, the map information, and information regarding a date and time/weather.

The control prediction unit 505 predicts control performed with respect to the camera 300 at T+N and control performed with respect to the self-location estimation system 200 at T+N, on the basis of a result of the prediction of the position of the sun in the image captured at T+N. Information regarding the control prediction is transmitted to the vehicle 10. In the vehicle 10, control with respect to the camera 300 and control with respect to the self-location estimation system 200 are performed at T+N on the basis of the information on the control prediction.

Examples of the control performed with respect to the camera 300 include an exposure control and a photometry-region control.

Examples of the control performed with respect to the self-location estimation system 200 include control performed with respect to the sensing device upon estimating a self-location and a posture of the vehicle 10.

Specifically, the control prediction unit 505 predicts how image information from the camera 300 and detection information from the vehicle-state detection sensor 400 are respectively weighted in the self-location estimation system 200 to be used for estimating a location and a posture of the vehicle.

Further, when a self-location and a posture are estimated in the self-location estimation system 200 on the basis of image information regarding an image captured by the camera 300, the control prediction unit 505 predicts how a mask region is set, the mask region being a characteristic-point extraction region not used for a characteristic point extraction performed to estimate a self-location and a posture.

Furthermore, when a self-location is estimated in the self-location estimation system 200 on the basis of image information regarding an image captured by the camera 300, the control prediction unit 505 predicts how respective pieces of image information from a plurality of cameras 300 are weighted to be used upon estimating a self-location and a posture.

As described above, an operation regarding a sensing device of the vehicle 10 is controlled on the basis of control prediction information transmitted from the server apparatus 500, the control prediction information being information regarding prediction of control performed with respect to a sensing device such as the camera 300 and the vehicle-state detection sensor 400 that are installed in the vehicle 10.

This results in obtaining a highly robust control system in which an impact of a disturbance factor that is the sun is reduced.

Each structural element is described below in detail.

[Example of Configuration of Vehicle Control System]

Figure 2:
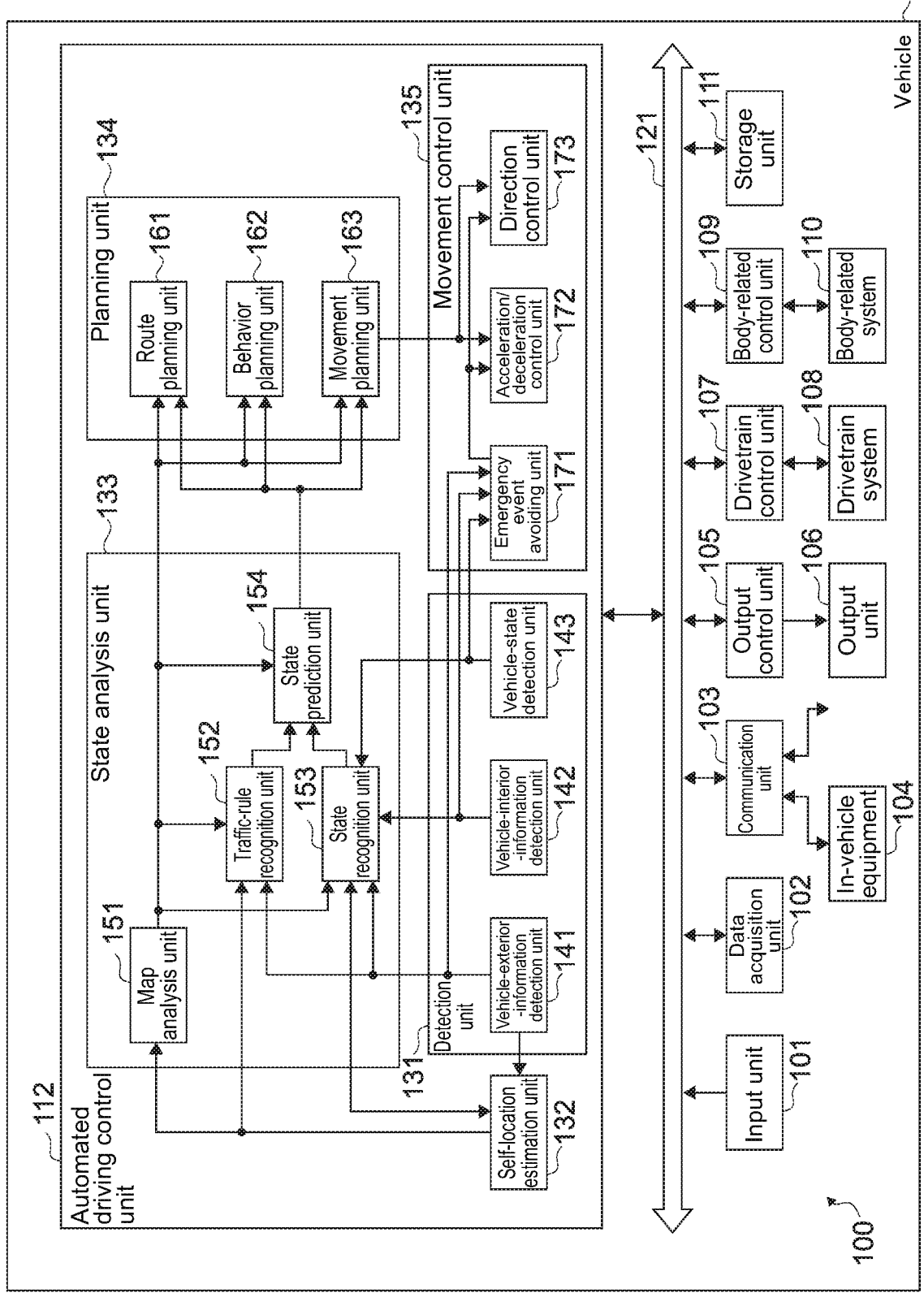
FIG. 2 is a block diagram of an example of a schematic functional configuration of a vehicle control system in the sensing-device control system.

FIG. 2 is a block diagram of an example of a schematic functional configuration of the vehicle control system 100 that is an example of a mobile object control system to which the present technology is applicable.

Note that, when a vehicle provided with the vehicle control system 100 is to be distinguished from other vehicles, the vehicle provided with the vehicle control system 100 will be hereinafter referred to as an own automobile or an own vehicle.

The vehicle control system 100 includes an input unit 101, a data acquisition unit 102, a communication unit 103, in-vehicle equipment 104, an output control unit 105, an output unit 106, a drivetrain control unit 107, a drivetrain system 108, a body-related control unit 109, a body-related system 110, a storage unit 111, and an automated driving control unit 112. The input unit 101, the data acquisition unit 102, the communication unit 103, the output control unit 105, the drivetrain control unit 107, the body-related control unit 109, the storage unit 111, and the automated driving control unit 112 are connected to each other through a communication network 121. For example, the communication network 121 includes a bus or a vehicle-mounted communication network compliant with any standard such as a controller area network (CAN), a local interconnect network (LIN), a local area network (LAN), or FlexRay (registered trademark). Note that the respective structural elements of the vehicle control system 100 may be directly connected to each other without using the communication network 121.

Note that the description of the communication network 121 will be omitted below when the respective structural elements of the vehicle control system 100 communicate with each other through the communication network 121. For example, when the input unit 101 and the automated driving control unit 112 communicate with each other through the communication network 121, it will be simply stated that the input unit 101 and the automated driving control unit 112 communicate with each other.

The input unit 101 includes an apparatus used by a person on board to input various pieces of data, instructions, or the like. For example, the input unit 101 includes an operation device such as a touch panel, a button, a microphone, a switch, or a lever; an operation device with which input can be performed by a method other than a manual operation, such as sound or a gesture; or the like. Alternatively, for example, the input unit 101 may be externally connected equipment such as a remote-control apparatus using infrared or another radio wave, or mobile equipment or wearable equipment compatible with operation of the vehicle control system 100. The input unit 101 generates an input signal on the basis of data, an instruction, or the like input by a person on board, and supplies the generated input signal to the respective structural elements of the vehicle control system 100.

The data acquisition unit 102 includes various sensors or the like for acquiring data used for a process performed by the vehicle control system 100, and supplies the acquired data to the respective structural elements of the vehicle control system 100.

For example, the data acquisition unit 102 includes various sensors for detecting a state and the like of the own automobile. Specifically, for example, the data acquisition unit 102 includes a gyro sensor; an acceleration sensor; an inertial measurement unit (IMU); and a sensor or the like for detecting an amount of operation of an accelerator pedal, an amount of operation of a brake pedal, a steering angle of a steering wheel, the number of revolutions of an engine, the number of revolutions of a motor, a speed of wheel rotation, or the like.

Further, for example, the data acquisition unit 102 includes various sensors for detecting information regarding the outside of the own automobile. Specifically, for example, the data acquisition unit 102 includes an image-capturing device such as a time-of-flight (ToF) camera, a stereo camera, a monocular camera, an infrared camera, and other cameras. Furthermore, for example, the data acquisition unit 102 includes an environment sensor for detecting weather, a meteorological phenomenon, or the like, and a surrounding-information detection sensor for detecting an object around the own automobile. For example, the environment sensor includes a raindrop sensor, a fog sensor, a sunshine sensor, a snow sensor, or the like. The surrounding-information detection sensor includes an ultrasonic sensor, a radar, a LiDAR (light detection and ranging, laser imaging detection and ranging) sensor, a sonar, or the like.

Moreover, for example, the data acquisition unit 102 includes various sensors for detecting a current location of the own automobile. Specifically, for example, the data acquisition unit 102 includes a global navigation satellite system (GNSS) receiver or the like. The GNSS receiver receives a GNSS signal from a GNSS satellite.

Further, for example, the data acquisition unit 102 includes various sensors for detecting information regarding the inside of a vehicle. Specifically, for example, the data acquisition unit 102 includes an image-capturing device that captures an image of a driver, a biological sensor that detects biological information of the driver, a microphone that collects sound in the interior of a vehicle, and the like. For example, the biological sensor is provided to a seat surface, the steering wheel, or the like, and detects biological information of a person on board sitting on a seat, or a driver holding the steering wheel.

The communication unit 103 communicates with the in-vehicle equipment 104 as well as various pieces of vehicle-exterior equipment, a server, a base station, and the like, transmits data supplied by the respective structural elements of the vehicle control system 100, and supplies the received data to the respective structural elements of the vehicle control system 100. Note that a communication protocol supported by the communication unit 103 is not particularly limited. It is also possible for the communication unit 103 to support a plurality of types of communication protocols.

For example, the communication unit 103 wirelessly communicates with the in-vehicle equipment 104 using a wireless LAN, Bluetooth (registered trademark), near-field communication (NFC), a wireless USB (WUSB), or the like. Further, for example, the communication unit 103 communicates with the in-vehicle equipment 104 by wire using a universal serial bus (USB), a high-definition multimedia interface (HDMI) (registered trademark), a mobile high-definition link (MHL), or the like through a connection terminal (not illustrated) (and a cable if necessary).

Further, for example, the communication unit 103 communicates with equipment (for example, an application server or a control server) situated in an external network (for example, the Internet, a cloud network, or a carrier-specific network) through a base station or an access point. Furthermore, for example, the communication unit 103 communicates with a terminal (for example, a terminal of a pedestrian or a store, or a machine-type communication (MTC) terminal) situated near the own automobile, using a peer-to-peer (P2P) technology. Moreover, for example, the communication unit 103 performs V2X communication such as vehicle-to-vehicle communication, vehicle-to-infrastructure communication, vehicle-to-home communication between the own automobile and a home, and vehicle-to-pedestrian communication. Further, for example, the communication unit 103 includes a beacon receiver, receives a radio wave or an electromagnetic wave transmitted from, for example, a radio station installed on a road, and acquires information regarding, for example, the current location, traffic congestion, traffic regulation, or necessary time.

Examples of the in-vehicle equipment 104 include mobile equipment or wearable equipment of a person on board, information equipment that is brought in or attached to the own automobile, and a navigation apparatus that searches for a route to any destination.

The output control unit 105 controls output of various pieces of information to a person on board of the own automobile or to the outside of the own automobile. For example, the output control unit 105 generates an output signal that includes at least one of visual information (such as image data) or audio information (such as sound data), supplies the output signal to the output unit 106, and thereby controls output of the visual information and the audio information from the output unit 106. Specifically, for example, the output control unit 105 combines pieces of data of images captured by different image-capturing devices of the data acquisition unit 102, generates a bird's-eye image, a panoramic image, or the like, and supplies an output signal including the generated image to the output unit 106. Further, for example, the output control unit 105 generates sound data including, for example, a warning beep or a warning message alerting a danger such as collision, contact, or entrance into a dangerous zone, and supplies an output signal including the generated sound data to the output unit 106.

The output unit 106 includes an apparatus capable of outputting the visual information or the audio information to a person on board of the own automobile or to the outside of own automobile. For example, the output unit 106 includes a display apparatus, an instrument panel, an audio speaker, headphones, a wearable device such as an eyeglass-type display used to be worn on the person on board, a projector, a lamp, or the like. Instead of an apparatus including a commonly used display, the display apparatus included in the output unit 106 may be an apparatus, such as a head-up display, a transparent display, or an apparatus including an augmented reality (AR) display function, that displays the visual information in the field of view of a driver.

The drivetrain control unit 107 generates various control signals, supplies them to the drivetrain system 108, and thereby controls the drivetrain system 108. Further, the drivetrain control unit 107 supplies the control signals to the structural elements other than the drivetrain system 108 as necessary to, for example, notify them of a state of controlling the drivetrain system 108.

The drivetrain system 108 includes various apparatuses related to the drivetrain of the own automobile. For example, the drivetrain system 108 includes a driving force generation apparatus, such as an internal-combustion engine and a driving motor, that generates driving force, a driving force transmitting mechanism for transmitting the driving force to wheels, a steering mechanism that adjusts the steering angle, a braking apparatus that generates braking force, an antilock braking system (ABS), an electronic stability control (ESC) system, an electric power steering apparatus, and the like.

The body-related control unit 109 generates various control signals, supplies them to the body-related system 110, and thereby controls the body-related system 110. Further, the body-related control unit 109 supplies the control signals to the structural elements other than the body-related system 110 as necessary to, for example, notify them of a state of controlling the body-related system 110.

The body-related system 110 includes various body-related apparatuses provided to a vehicle body. For example, the body-related system 110 includes a keyless entry system, a smart key system, a power window apparatus, a power seat, a steering wheel, an air conditioner, various lamps (such as headlamps, tail lamps, brake lamps, direction-indicator lamps, and fog lamps), and the like.

For example, the storage unit 111 includes a read only memory (ROM), a random access memory (RAM), a magnetic storage device such as a hard disc drive (HDD), a semiconductor storage device, an optical storage device, a magneto-optical storage device, and the like. The storage unit 111 stores therein various programs, data, and the like that are used by the respective structural elements of the vehicle control system 100. For example, the storage unit 111 stores therein map data such as a three-dimensional high-accuracy map, a global map, and a local map. The high-accuracy map is a dynamic map or the like. The global map is less accurate and covers a wider area than the high-accuracy map. The local map includes information regarding the surroundings of the own automobile.

The automated driving control unit 112 performs control related to automated driving such as autonomous traveling or a driving assistance. Specifically, for example, the automated driving control unit 112 performs a cooperative control intended to implement a function of an advanced driver-assistance system (ADAS) including collision avoidance or shock mitigation for the own automobile, traveling after a leading vehicle based on a distance between vehicles, traveling while maintaining a vehicle speed, a warning of collision of the own automobile, a warning of deviation of the own automobile from a lane, or the like. Further, for example, the automated driving control unit 112 performs a cooperative control intended to achieve, for example, automated driving that is autonomous traveling without an operation performed by a driver. The automated driving control unit 112 includes a detection unit 131, a self-location estimation unit 132, a state analysis unit 133, a planning unit 134, and a movement control unit 135.

The detection unit 131 detects various pieces of information necessary to control automated driving. The detection unit 131 includes a vehicle-exterior-information detection unit 141, a vehicle-interior-information detection unit 142, and a vehicle-state detection unit 143.

The vehicle-exterior-information detection unit 141 performs a process of detecting information regarding the outside of the own automobile on the basis of data or a signal from each structural element of the vehicle control system 100. For example, the vehicle-exterior-information detection unit 141 performs processes of detecting, recognizing, and tracking an object around the own automobile, and a process of detecting a distance to the object. Examples of the detection-target object include a vehicle, a person, an obstacle, a structure, a road, a traffic light, a traffic sign, and a road sign. Further, for example, the vehicle-exterior-information detection unit 141 performs a process of detecting an environment surrounding the own automobile. Examples of the detection-target surrounding environment includes weather, temperature, humidity, brightness, and a road surface condition. The vehicle-exterior-information detection unit 141 supplies data indicating a result of the detection process to, for example, the self-location estimation unit 132; a map analysis unit 151, a traffic-rule recognition unit 152, and a state recognition unit 153 of the state analysis unit 133; and an emergency event avoiding unit 171 of the movement control unit 135.

The vehicle-interior-information detection unit 142 performs a process of detecting information regarding the inside of a vehicle on the basis of data or a signal from each structural element of the vehicle control system 100. For example, the vehicle-interior-information detection unit 142 performs processes of authenticating and recognizing a driver, a process of detecting a state of the driver, a process of detecting a person on board, and a process of detecting a vehicle interior environment. Examples of the detection-target state of a driver include a physical condition, a degree of arousal, a degree of concentration, a degree of fatigue, and a direction of a line of sight. Examples of the detection-target vehicle interior environment include temperature, humidity, brightness, and odor. The vehicle-interior-information detection unit 142 supplies data indicating a result of the detection process to, for example, the state recognition unit 153 of the state analysis unit 133 and the emergency event avoiding unit 171 of the movement control unit 135.

The vehicle-state detection unit 143 performs a process of detecting a state of the own automobile on the basis of data or a signal from each structural element of the vehicle control system 100. Examples of the detection-target state of the own automobile include speed, acceleration, a steering angle, the presence or absence of anomaly and its details, a driving operation state, a position and an inclination of a power seat, a state of a door lock, and states of other pieces of vehicle-mounted equipment. The vehicle-state detection unit 143 supplies data indicating a result of the detection process to, for example, the state recognition unit 153 of the state analysis unit 133 and the emergency event avoiding unit 171 of the movement control unit 135.

The self-location estimation unit 132 performs a process of estimating a location, a posture, and the like of the own automobile on the basis of data or signals from the respective structural elements of the vehicle control system 100, such as the vehicle-exterior-information detection unit 141, and the state recognition unit 153 of the state analysis unit 133. Further, the self-location estimation unit 132 generates, as necessary, a local map (hereinafter referred to as a self-location estimation map) used to estimate a self-location. For example, the self-location estimation map is a high-accuracy map using a technology such as simultaneous localization and mapping (SLAM). The self-location estimation unit 132 supplies data indicating a result of the estimation process to, for example, the map analysis unit 151, the traffic-rule recognition unit 152, and the state recognition unit 153 of the state analysis unit 133. Further, the self-location estimator 132 stores the self-location estimation map in the storage unit 111.

The state analysis unit 133 performs a process of analyzing states of the own automobile and its surroundings. The state analysis unit 133 includes the map analysis unit 151, the traffic-rule recognition unit 152, the state recognition unit 153, and the state prediction unit 154.

Using, as necessary, data or signals from the respective structural elements of the vehicle control system 100, such as the self-location estimation unit 132 and the vehicle-exterior-information detection unit 141, the map analysis unit 151 performs a process of analyzing various maps stored in the storage unit 111, and constructs a map including information necessary for an automated driving process. The map analysis unit 151 supplies the constructed map to, for example, the traffic-rule recognition unit 152, the state recognition unit 153, and the state prediction unit 154, as well as a route planning unit 161, a behavior planning unit 162, and a movement planning unit 163 of the planning unit 134.

The traffic-rule recognition unit 152 performs a process of recognizing traffic rules around the own automobile on the basis of data or signals from the respective structural elements of the vehicle control system 100, such as the self-location estimation unit 132, the vehicle-exterior-information detection unit 141, and the map analysis unit 151. The recognition process makes it possible to recognize a location and a state of a traffic light around the own automobile, the details of traffic control performed around the own automobile, and a travelable lane. The traffic-rule recognition unit 152 supplies data indicating a result of the recognition process to, for example, the state prediction unit 154.

The state recognition unit 153 performs a process of recognizing a state related to the own automobile on the basis of data or signals from the respective structural elements of the vehicle control system 100, such as the self-location estimation unit 132, the vehicle-exterior-information detection unit 141, the vehicle-interior-information detection unit 142, the vehicle-state detection unit 143, and the map analysis unit 151. For example, the state recognition unit 153 performs a process of recognizing a state of the own automobile, a state of the surroundings of the own automobile, a state of a driver of the own automobile, and the like. Further, the state recognition unit 153 generates, as necessary, a local map (hereinafter referred to as a state recognition map) used to recognize the state of the surroundings of the own automobile. The state recognition map is, for example, an occupancy grid map.

Examples of the recognition-target state of the own automobile include a location, a posture, and movement (such as speed, acceleration, and a movement direction) of the own automobile, as well as the presence or absence of anomaly and its details. Examples of the recognition-target state of the surroundings of the own automobile include the type and a location of a stationary object around the own automobile; the type, a location, and movement (such as speed, acceleration, and a movement direction) of a moving object around the own automobile; a structure of a road around the own automobile and a condition of the surface of the road; and weather, temperature, humidity, and brightness around the own automobile. Examples of the recognition-target state of a driver include a physical condition, a degree of arousal, a degree of concentration, a degree of fatigue, movement of a line of sight, and a driving operation.

The state recognition unit 153 supplies data indicating a result of the recognition process (including a state recognition map as necessary) to, for example, the self-location estimation unit 132 and the state prediction unit 154. Further, the state recognition section 153 stores the state-recognition map in the storage unit 111.

The state prediction unit 154 performs a process of predicting a state related to the own automobile on the basis of data or signals from the respective structural elements of the vehicle control system 100, such as the map analysis unit 151, the traffic-rule recognition unit 152, and the state recognition unit 153. For example, the state prediction unit 154 performs a process of predicting a state of the own automobile, a state of the surroundings of the own automobile, a state of a driver, and the like.

Examples of the prediction-target state of the own automobile include the behavior of the own automobile, the occurrence of anomaly in the own automobile, and a travelable distance of the own automobile. Examples of the prediction-target state of the surroundings of the own automobile include the behavior of a moving object, a change in a state of a traffic light, and a change in environment such as weather around the own automobile. Examples of the prediction-target state of a driver include the behavior and the physical condition of the driver.

The state prediction unit 154 supplies data indicating a result of the prediction process to, for example, the route planning unit 161, the behavior planning unit 162, and the movement planning unit 163 of the planning unit 134 together with the data from the traffic-rule recognition unit 152 and the state recognition unit 153.

The route planning unit 161 plans a route to a destination on the basis of data or signals from the respective structural elements of the vehicle control system 100, such as the map analysis unit 151 and the state prediction unit 154. For example, the route planning unit 161 sets a route from a current location to a specified destination on the basis of a global map. Further, for example, the route planning unit 161 changes a route as appropriate on the basis of the states of, for example, traffic congestion, an accident, traffic regulation, and a construction, as well as the physical condition of a driver. The route planning unit 161 supplies data indicating the planned route to, for example, the behavior planning unit 162.

On the basis of data or signals from the respective structural elements of the vehicle control system 100, such as the map analysis unit 151 and the state prediction unit 154, the behavior planning unit 162 plans the behavior of the own automobile in order to travel safely on the route planned by the route planning unit 161 within a time planned by the route planning unit 161. For example, the behavior planning unit 162 makes plans about, for example, a start to move, a stop, a travel direction (such as a forward movement, a backward movement, a left turn, a right turn, and a change in direction), a lane for traveling, a traveling speed, and passing. The behavior planning unit 162 supplies data indicating the planned behavior of the own automobile to, for example, the movement planning unit 163.

On the basis of data or signals from the respective structural elements of the vehicle control system 100, such as the map analysis unit 151 and the state prediction unit 154, the movement planning unit 163 plans movement of the own automobile in order to achieve the behavior planned by the behavior planning unit 162. For example, the movement planning unit 163 makes plans about, for example, acceleration, deceleration, and a traveling course. The movement planning unit 163 supplies data indicating the planned movement of the own automobile to, for example, an acceleration/deceleration control unit 172 and a direction control unit 173 of the movement control unit 135.

The movement control unit 135 controls movement of the own automobile. The movement control unit 135 includes the emergency event avoiding unit 171, the acceleration/deceleration control unit 172, and the direction control unit 173.

On the basis of a result of the detections performed by the vehicle-exterior-information detection unit 141, the vehicle-interior-information detection unit 142, and the vehicle-state detection unit 143, the emergency event avoiding unit 171 performs a process of detecting emergency events such as collision, contact, entrance into a dangerous zone, something unusual in a driver, and anomaly in the vehicle. When the emergency event avoiding unit 171 detects the occurrence of an emergency event, the emergency event avoiding unit 171 plans movement of the own automobile such as a sudden stop or a quick turning for avoiding the emergency event. The emergency event avoiding unit 171 supplies data indicating the planned movement of the own automobile to, for example, the acceleration/deceleration control unit 172 and the direction control unit 173.

The acceleration/deceleration control unit 172 controls acceleration/deceleration to achieve the movement of the own automobile planned by the movement planning unit 163 or the emergency event avoiding unit 171. For example, the acceleration/deceleration control unit 172 computes a control target value for a driving force generation apparatus or a braking apparatus to achieve the planned acceleration, the planned deceleration, or the planned sudden stop, and supplies a control instruction indicating the computed control target value to the drivetrain control unit 107.

The direction control unit 173 controls a direction to achieve the movement of the own automobile planned by the movement planning unit 163 or the emergency event avoiding unit 171. For example, the direction control unit 173 computes a control target value for a steering mechanism to achieve the traveling course planned by the movement planning unit 163 or the quick turning planned by the emergency event avoiding unit 171, and supplies a control instruction indicating the computed control target value to the drivetrain control unit 107.

[Example of Configuration of Self-Location Estimation System]

Figure 3:
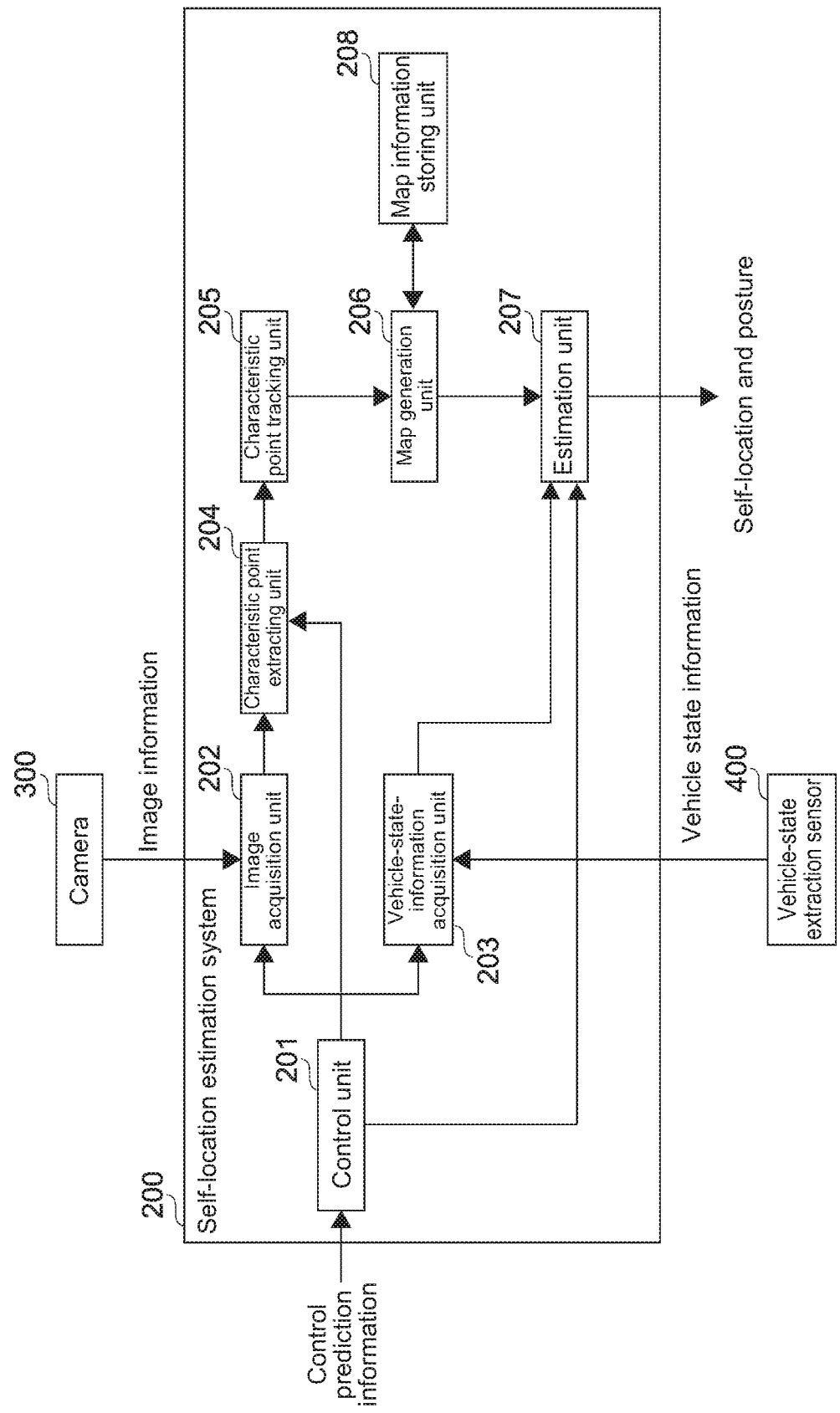
FIG. 3 is a block diagram of an example of a schematic functional configuration of a self-location estimation unit in the self-location estimation system.

FIG. 3 is a block diagram of an example of a configuration of the self-location estimation system 200 to which the present technology has been applied. The self-location estimation system 200 relates primarily to processes performed by the self-location estimation unit 132, the vehicle-exterior-information detection unit 141, and the state recognition unit 153 from among the vehicle control system 100, and a process of generating a map used to perform processing of estimating a self-location.

The self-location estimation system 200 is a system that estimates a self-location and a posture of the vehicle 10.

The self-location estimation system 200 includes a control unit 201, an image acquisition unit 202, a vehicle-state-information acquisition unit 203, a characteristic point extracting unit 204, a characteristic point tracking unit 205, a map generation unit 206, an estimation unit 207, and a map information storing unit 208.

In the self-location estimation system 200, a self (a vehicle 10's) location necessary for control processing performed by the vehicle control system 100 is estimated. In the self-location estimation system 200, image information regarding an image captured by the camera 300, vehicle state information from the vehicle-state detection sensor 400, and the like are used to estimate the location of the vehicle 10.

On the basis of control prediction information from the server apparatus 500, the control unit 201 outputs assignment-of-weights information regarding assignment of weights upon estimation to the estimation unit 207, the assignment-of-weights information indicating how the image information and the vehicle-state detection information are respectively weighted to be used for estimating a self-location and a posture of the vehicle 10.

Further, on the basis of the control prediction information, the control unit 201 controls how the respective pieces of image information acquired from a plurality of cameras 300 are weighted to be used for estimating a self-location and a posture of the vehicle 10. The control unit 201 outputs the assignment-of-weights information regarding assignment of weights to each camera to the image acquisition unit 202.

Furthermore, on the basis of the control prediction information, the control unit 201 performs control with respect to masking of a characteristic extraction region not used for a characteristic point extraction performed to estimate a self-location and a posture of the vehicle 10. The control unit 201 outputs information regarding masking of a characteristic-point extraction region to the characteristic point extracting unit 204.

The image acquisition unit 202 chronologically acquires images captured by the camera 300 being installed in the vehicle 10 and serving as a sensing device. In the present embodiment, a plurality of cameras 300 is installed, and this makes it possible to acquire range images obtained due to the parallax. Note that a single camera may be installed to acquire range images from chronologically captured multiple-frame images. The camera is included in the data acquisition unit 102 described above.

The image acquisition unit 202 outputs the chronological images that are selected images to the characteristic point extracting unit 204 together with the assignment-of-weights information regarding assignment of weights to each camera from the control unit 201.

The assignment of weights to the camera 300 includes, for example, selection of a camera 300, from among a plurality of cameras 300, that is not used upon estimating a self-location and a posture. In this case, a weight assigned to image information regarding an image captured by the unused camera 300 is zero.

The vehicle-state-information acquisition unit 203 chronologically acquires results of a vehicle state detection performed by the vehicle-state detection sensor 400 installed in the vehicle 10.

Examples of the vehicle-state detection sensor 400 include a GNSS that detects a current location of the vehicle 10, and sensors that detect a state and the like of the vehicle 10 such as a gyro sensor; an acceleration sensor; an inertial measurement unit (IMU); and a sensor or the like for detecting an amount of operation of an accelerator pedal, an amount of operation of a brake pedal, a steering angle of a steering wheel, the number of revolutions of an engine, the number of revolutions of a motor, a speed of wheel rotation, or the like.

On the basis of the information regarding masking of a characteristic-point extraction region from the control unit 201, the characteristic point extracting unit 204 masks, as necessary, a characteristic-point extraction region in the chronological images input by the image acquisition unit 202.

For example, a region of a position of the sun in an image is a mask region obtained by masking a characteristic-point extraction region, and a characteristic point situated in this region is not extracted.

The characteristic point extracting unit 204 extracts a characteristic point of a stationary object from a region other than the mask region obtained by masking a characteristic-point extraction region in the image, and outputs the extracted characteristic point to the characteristic point tracking unit 205.

Specifically, the characteristic point extracting unit 204 extracts a stationary object (a landmark) from the successively input chronological images, and extracts a characteristic point of the extracted stationary object.

The characteristic point tracking unit 205 tracks, in the sequentially input chronological images, the characteristic point extracted by the characteristic point extracting unit 204, and provides the map generation unit 206 with information regarding the tracking.

The map generation unit 206 generates map information that is applicable to estimation of a self-location and includes a three-dimensional coordinate (three-dimensional point) of a stationary object (characteristic point) in a world coordinate system of the object.

The map generation unit 206 updates an initial map at preset intervals. In other words, the map generation unit 206 initializes, at the preset intervals, map information of an object (a coordinate of the object in the world coordinate system) that is stored in the map information storing unit 208, so as to update the map information.

On the basis of the assignment-of-weights information regarding assignment of weights upon estimation that is output by the control unit 201, the estimation unit 207 respectively assigns weights to the map information generated by the map generation unit 206 and the vehicle-state detection information output by the vehicle-state-information acquisition unit 203, and estimates a self-location and a posture of the vehicle 10 using these pieces of information.

On the basis of the coordinate of the object in the world coordinate system (the three-dimensional coordinate of the characteristic point), the estimation unit 207 estimates a transformation matrix representing transformation from the world coordinate system to a camera coordinate system that represents a coordinate system based on a camera, and estimates, on the basis of the transformation matrix, an angle of rotation that represents a location and a posture of the vehicle 10 with respect to the stationary object (the characteristic point).

For example, when the assignment-of-weights information indicates that a weight assigned to image information is 100 and a weight assigned to vehicle-state detection information is 0, the estimation unit 207 estimates a self-location and a posture of the vehicle 10 only on the basis of map information generated by the map generation unit 206 on the basis of the image information.

On the other hand, when the assignment-of-weights information indicates that the weight assigned to the image information is 0 and the weight assigned to the vehicle-state detection information is 100, the estimation unit 207 estimates the self-location and the posture of the vehicle 10 only on the basis of the vehicle-state detection information.

For example, when it is difficult to acquire, using the camera 300, an image suitable to estimate a self-location and a posture, due to sunlight due to the sun being reflected in an image, the self-location and the posture of the vehicle 10 are estimated using the vehicle-state detection information and the image information in a state in which the vehicle-state detection information is more heavily weighted than the image information.

The map information storing unit 208 stores therein map information that includes a coordinate of an object in a world coordinate system.

[Example of Configuration of Camera]

Figure 4:
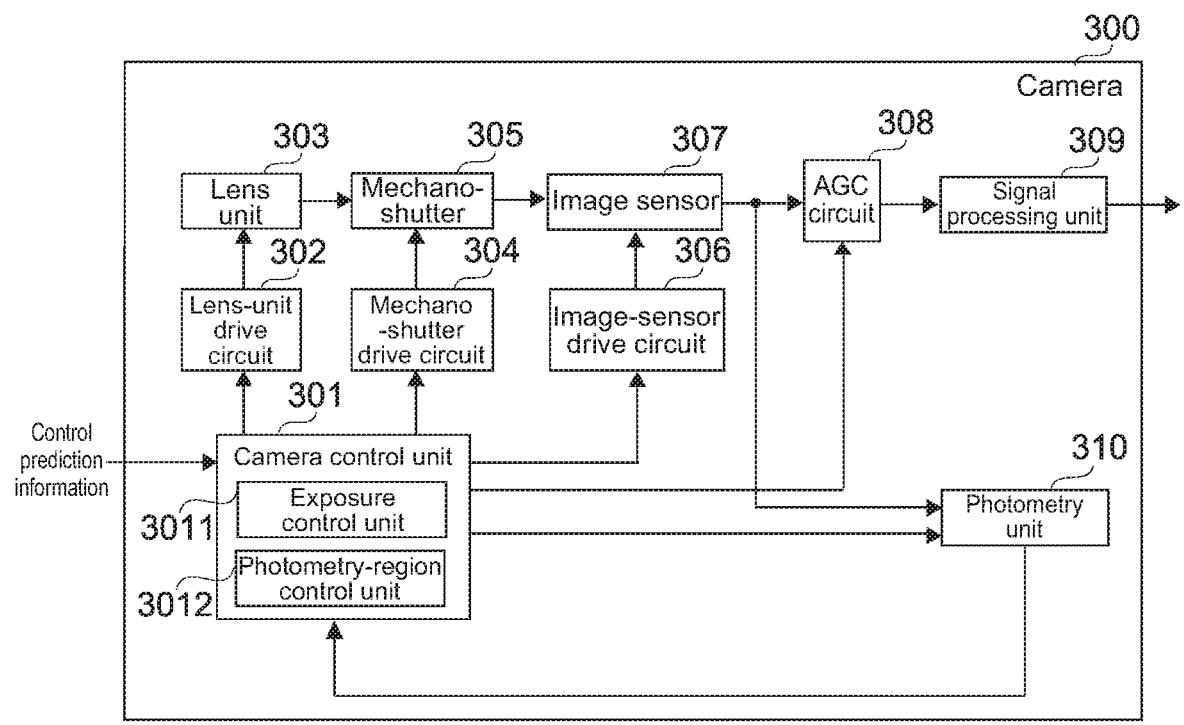
FIG. 4 is a block diagram of an example of a schematic functional configuration of a camera included in a vehicle.

FIG. 4 is a block unit of an example of a configuration of the camera 300 serving as an image-capturing device.

The camera 300 is an image sensor that captures an image of the surroundings of the vehicle 10 at a specified frame rate, and detects image information regarding the image of the surroundings of the vehicle 10.

For example, two front cameras and two rear cameras are installed in the vehicle 10, the two front cameras capturing an image of the view to the front of the vehicle 10 and being respectively provided on the left and on the right in the front of a vehicle body, the two rear cameras capturing an image of the view to the rear of the vehicle 10 and being respectively provided on the left and on the right in the rear of the vehicle body.

For example, an RGB camera that includes an image sensor such as a CCD or a CMOS is used as the camera 300. The camera 300 is not limited to this, and, for example, an image sensor that detects infrared light or polarization light may be used as appropriate. The use of infrared light or polarization light makes it possible to generate, for example, image information regarding an image in which there is not a great change in how the image looks even if there is a change in weather.

In the camera 300 according to the present embodiment, image information is generated by performing, for example, an exposure control and a photometry-region control on the basis of control prediction information from the server apparatus 500.

The camera 300 includes a camera control unit 301, a lens-unit drive circuit 302, a lens unit 303, a mechanical shutter (hereinafter abbreviated to a mechano-shutter, and the same applies to the figure) drive circuit 304, a mechano-shutter 305, an image-sensor drive circuit 306, an image sensor 307, an automatic-gain control (AGC) circuit 308, a signal processing unit 309, and a photometry unit 310.

The camera control unit 301 includes an exposure control unit 3011 and a photometry-region control unit 3012.

The exposure control unit 3011 generates a control signal that controls light exposure, on the basis of control prediction information supplied by the server apparatus 500 and a result of photometry performed by the photometry unit 310.

On the basis of the control prediction information supplied by the server apparatus 500, the exposure control unit 3011 generates a control signal that controls a lens position and a stop of the lens unit 303 through the lens-unit drive circuit 302, controls driving of the mechano-shutter 305 through the mechano-shutter drive circuit 304, controls an electrical operation of the image sensor 307 through the image-sensor drive circuit 306, and controls an operation timing of the AGC circuit 308. Accordingly, light exposure is controlled.

On the basis of the control prediction information supplied by the server apparatus 500, the photometry-region control unit 3012 supplies a control signal that defines a photometry region to the photometry unit 310.

For example, the photometry-region control unit 3012 generates a control signal that defines a region for the photometry unit 310 in accordance with the control prediction information indicating that a region, in an image, in which it has been predicted by the server apparatus 500 that the sun will be reflected is not to be set to be a photometry target (masking processing regarding a photometry region), and the other region is to be set to be a photometry target.

The lens-unit drive circuit 302 includes a motor and the like, and, on the basis of the control signal supplied by the camera control unit 301, the lens-unit drive circuit 302 adjusts a focal position and a stop by moving the lens position of the lens unit 303.

The mechano-shutter drive circuit 304 controls a shutter speed and a shutter timing of the mechano-shutter 305 on the basis of the control signal supplied by the camera control unit 301.

The mechano-shutter 305 is arranged on an entire surface of the image sensor 307, and is opened or closed according to control performed by the mechano-shutter drive circuit 304 so that light passing through the lens unit 303 is transmitted through the mechano-shutter 305 or is blocked by the mechano-shutter 305.

Note that the example of using a mechano-shutter is described in the present embodiment, but an electronic shutter may be used.

The image-sensor drive circuit 306 generates a signal that drives the image sensor 307 on the basis of, for example, a timing signal supplied by the camera control unit 301, and adjusts, for example, a timing of capturing an image.

The image sensor 307 includes a solid-state imaging element such as a complementary metal oxide semiconductor (CMOS) image sensor or a charged coupled device (CCD) image sensor.

The image sensor 307 receives light from a subject that enters through the lens unit 303 to photoelectrically convert the received light, and outputs an analog image signal depending on the amount of light received to the AGC circuit 308 and the photometry unit 310.

The AGC circuit 308 adjusts a gain of the image signal on the basis of the control signal from the exposure control unit 3011, and outputs, to the signal processing unit 309, the image signal of which the gain has been adjusted.

The signal processing unit 309 performs analog/digital (A/D) conversion with respect to the analog image signal from the AGC circuit 308. Further, with respect to image data represented by a digital signal obtained by the A/D conversion, the signal processing unit 309 applies denoising processing or the like, and outputs, to the image acquisition unit 202 of the self-location estimation system 200, image data (image information) obtained as a result of applying the denoising processing or the like.

The photometry unit 310 performs photometry on the basis of the image signal from the image sensor 307. Upon performing photometry, the photometry unit 310 performs photometry with respect to a defined photometry region, on the basis of the control signal supplied by the camera control unit 301. The photometry unit 310 outputs a result of the photometry to the camera control unit 301.

[Example of Configuration of Server Apparatus]

Figure 5:
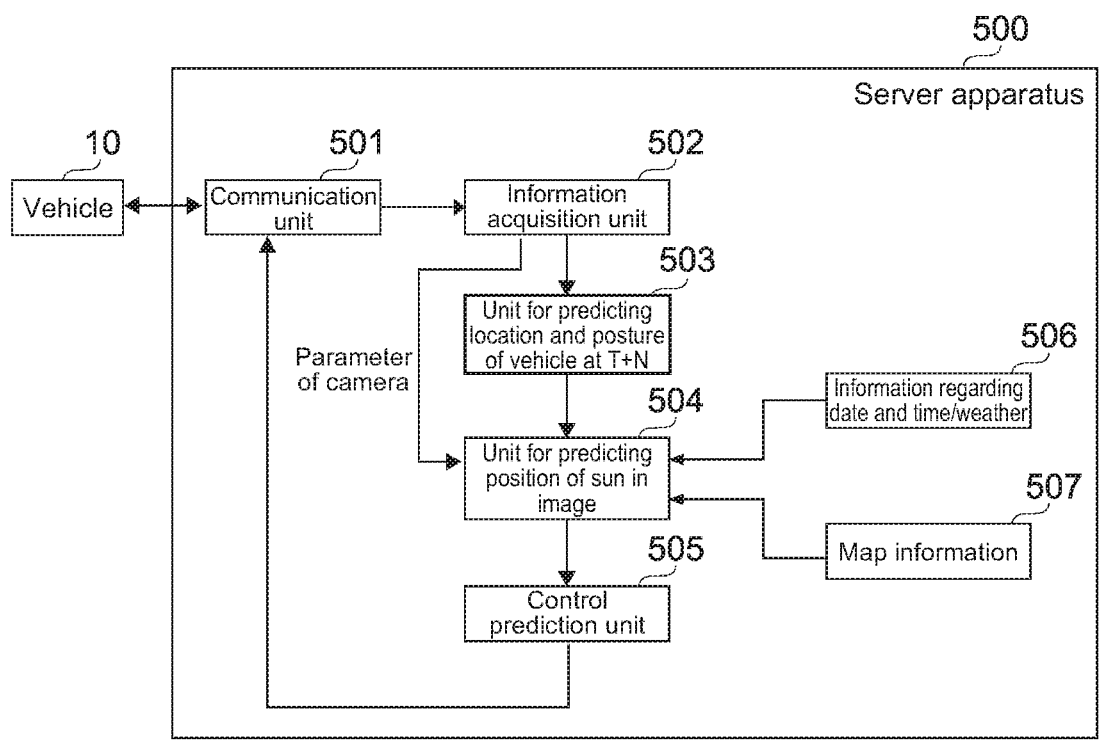
FIG. 5 is a block diagram of an example of a schematic functional configuration of a server apparatus in the sensing-device control system.

FIG. 5 is a block diagram of an example of a configuration of the server apparatus 500.

As illustrated in FIG. 5, the server apparatus 500 includes a communication unit 501, the information acquisition unit 502, the unit 503 for predicting a location and a posture of a vehicle at T+N, the unit 504 for predicting a position of a disturbance factor (the sun) in an image, and the control prediction unit 505.

The communication unit 501 communicates with equipment (for example, an application server or a control server) situated in the vehicle 10 or an external network (for example, the Internet, a cloud network, or a carrier-specific network) through a base station or an access point.

The communication unit 501 receives various information from the vehicle 10, and outputs the received information to the information acquisition unit 502. The communication unit 501 transmits, to the vehicle 10, control prediction information received from the control prediction unit 505.

The information acquisition unit 502 acquires, from the vehicle 10 and through the communication unit 501, parameter information regarding a parameter of the camera 300, information regarding a location and a posture of the vehicle 10 at a time T, and vehicle state information of the vehicle 10 at the time T.

The parameter information regarding a parameter of the camera 300 is output to the unit 504 for predicting a position of the sun in an image.

The information regarding a location and a posture of the vehicle 10 at the time T, and the vehicle state information of the vehicle 10 at the time T are output to the unit 503 for predicting a location and a posture of a vehicle at T+N.

The information regarding a location of the vehicle 10 is, for example, information of a GNSS signal detected by the data acquisition unit 102.

The vehicle state information includes pieces of information detected by a gyro sensor, an acceleration sensor, and an inertial measurement unit (IMU); and information such as an amount of operation of an accelerator pedal, an amount of operation of a brake pedal, a steering angle of a steering wheel, the number of revolutions of an engine, the number of revolutions of a motor, or a speed of wheel rotation.

The parameters of the camera 300 include an internal parameter and an external parameter.

The internal parameter of the camera 300 is camera-specific information, such as a focal length of a camera lens, distortion characteristics of a lens, and an error in a position of mounting a lens, that is determined independently of a vehicle status.

The external parameter of the camera 300 is information regarding a position and an orientation of mounting each camera 300, with a self-location and a posture of the vehicle 10 being the center of the vehicle 10, that is, information regarding a position and a posture of the camera 300, with the center of the vehicle 10 being used as a reference.

The unit 503 for predicting a location and a posture of a vehicle at T+N predicts a location and a posture of the vehicle 10 at T+N on the basis of the information regarding a location and a posture of the vehicle 10 at the time T and the vehicle state information of the vehicle 10 at the time T that are output from the information acquisition unit 502. The unit 503 for predicting a location and a posture of a vehicle at T+N outputs a result of the prediction to the unit 504 for predicting a position of the sun in an image.

The unit 504 for predicting a position of the sun in an image predicts a position of the sun in an image predicted to be captured by the camera 300 at T+N on the basis of the parameter information of the camera 300, information regarding the location and the posture of the vehicle at T+N, information 506 regarding a date and time/weather, and map information 507.

Specifically, first, using the date-and-time information, information regarding the predicted location and posture of the vehicle 10 at T+N, and the map information 507, the unit 504 for predicting a position of the sun in an image calculates the elevation (elevation angle) and azimuth of the sun in a location in which the vehicle 10 is predicted to exist at T+N.

Next, the unit 504 for predicting a position of the sun in an image determines whether the sun will be out on the basis of the weather information regarding weather in the location in which the vehicle 10 is predicted to exist at T+N.

For example, when the unit 504 for predicting a position of the sun in an image has determined, from the weather information, that the sun will be out in clear weather, the unit 504 for predicting a position of the sun in an image predicts a position of the sun in an image predicted to be captured by the camera 300 at T+N, on the basis of information regarding the elevation and azimuth of the sun at T+N, the information regarding the location and posture of the vehicle 10, and the parameter information of the camera 300.

On the other hand, when the unit 504 for predicting a position of the sun in an image has determined, from the weather information, that the sun will not be out in rainy weather, the unit 504 for predicting a position of the sun in an image predicts that the sun will not be reflected in the image captured by the camera 300 at T+N.

Here, the information 506 regarding a date and time/weather can be acquired by, for example, the server apparatus 500 communicating with an application server that exists in an external network.

The map information 507 is stored in the server apparatus 500 in advance and updated as necessary at preset intervals.

A result of the prediction performed by the unit 504 for predicting a position of the sun in an image with respect to the position of the sun in an image, is output to the control prediction unit 505.

On the basis of the input result of the prediction performed with respect to the position of the sun in an image, the control prediction unit 505 predicts control performed with respect to the sensing device. Control prediction information regarding the control predicted by the control prediction unit 505 is transmitted to the vehicle 10 through the communication unit 501.

The control performed with respect to the sensing device includes control performed with respect to the camera 300 and control performed in the self-location estimation system 200 with respect to the sensing device.

The control performed with respect to the camera 300 includes an exposure control and a photometry-region control.

First, the exposure control that is the control performed with respect to the camera 300 is described.

Generally, in the camera 300, an image sensor included in the camera 300 receives light from a subject, and an image signal depending on the amount of light received is supplied to the photometry unit. In the photometry unit, photometry is performed on the basis of the image signal, and an adequate exposure value is calculated on the basis of a brightness value obtained as a photometry value. The exposure control is performed on the basis of the calculated exposure value.

When the exposure control is performed on the basis of an exposure value calculated at the time T, an image captured under an exposure condition proper at the time T is obtained at T+M (M>0), that is, after a lapse of M minutes from the time T. In other words, it is not possible to obtain an image perfect for the time T under the exposure condition proper at the time T, and thus a time lag occurs.

On the other hand, in the camera 300 of the vehicle 10, it is possible to set an exposure condition at T+N for the camera 300 in advance to perform image-capturing, on the basis of control prediction information regarding an exposure control performed with respect to the camera 300 at T+N that is predicted by the server apparatus 500. This results in being able to perform image-capturing, without a time lag, at T+N under a proper exposure condition for a state at T+N.

Examples of the exposure control include control such as adjustment of a shutter speed and adjustment of a gain of an image signal. For example, when the sun is reflected in an image, the control prediction unit 505 predicts an exposure control such as increasing a shutter speed and lowering a gain, since the sun makes the image too clear.

Information regarding the control prediction is transmitted to the vehicle 10, and the exposure control with respect to the camera 300 is performed on the basis of the transmitted information. This is an exposure condition upon performing image-capturing at T+N.

Here, when a self-location and a posture are estimated using an image in the self-location estimation system 200, sight of a characteristic point in an image may be lost or the characteristic point in the image may be falsely recognized due to the sun being reflected in the image upon extracting the characteristic point, and this may result in there being a decrease in the accuracy in estimating a self-location and a posture.

On the other hand, in the present embodiment, the reflection of the sun in an image at T+N is predicted in advance to predict an exposure control such that a proper image can be obtained. It is possible to capture an image that is to be captured at T+N under an exposure condition based on information regarding the prediction.

This enables the vehicle 10 to obtain an image that is captured with an adequate exposure and is proper for a state at T+N. Thus, upon estimating a self-location and a posture using an image, it is possible to use an image that is captured under a proper exposure condition and in which sight of a characteristic point is less likely to be lost, and this results in an improvement in the accuracy in estimating a self-location and a posture.

Next, the photometry-region control that is the control performed with respect to the camera 300 is described.

For example, when the sun is reflected in an image, the control prediction unit 505 predicts the photometry-region control performed such that a region, in the image, in which the sun is reflected is excluded from a photometry region. Control prediction information regarding the control predicted by the control prediction unit 505 is transmitted to the vehicle 10 through the communication unit 501.

Here, when the sun is reflected in an image, a region in which the sun is reflected and the surroundings of the region in the image are excessively bright, and a region other than the excessively bright region is dark, which results in blocked-up shadows. When a self-location and a posture are estimated in the self-location estimation system 200 using such an image, sight of a characteristic point in the image may be lost or the characteristic point in the image may be falsely recognized.

On the other hand, in the present embodiment, the reflection of the sun is predicted in advance, and a region, in the image, in which the sun is reflected is excluded from a photometry region to perform photometry. This makes it possible to provide a proper image without blocked-up shadows. Thus, upon estimating a self-location and a posture using an image, it is possible to provide a proper image in which sight of a characteristic point is less likely to be lost, and this results in an improvement in the accuracy in estimating a self-location and a posture.

The control performed in the self-location estimation system 200 with respect to the sensing device includes control that is performed upon estimating a self-location and a posture and is related to assignment of weights to image information and vehicle-state detection information, control of a characteristic-point-extraction mask region that is performed upon estimating the self-location and the posture, and control that is performed upon estimating the self-location and the posture and is related to assignment of weights to respective pieces of image information from a plurality of cameras 300.

First, the control related to assignment of weights to image information and vehicle-state detection information is described.

For example, when the sun is reflected in an image, a region in which the sun is reflected and the surroundings of the region in the image are excessively bright, and a region other than the excessively bright region is dark, which results in blocked-up shadows. When a self-location and a posture are estimated in the self-location estimation system 200 using such an image, sight of a characteristic point may be lost or the characteristic point may be falsely recognized.

In such a case, the control prediction unit 505 predicts control performed such that the vehicle-state detection information is more heavily weighted than the image information to estimate a self-location and a posture in the self-location estimation system 200. Since a self-location and a posture are estimated in the vehicle 10 on the basis of information regarding this control prediction, there is an improvement in the accuracy in estimating a self-location and a posture.

Next, the control of a characteristic-point-extraction mask region is described.

For example, when the sun is reflected in an image, sight of a characteristic point in the image may be lost or the characteristic point in the image may be falsely recognized in a region in the image in which the sun is reflected, due to the brilliance of the sun.

In such a case, the control prediction unit 505 predicts control performed such that, upon estimating a self-location and a posture in the self-location estimation system 200 using an image, a region in the image in which the sun is reflected is set to be a region not used to extract a characteristic point (characteristic-point-extraction mask region).

In the vehicle 10, on the basis of information regarding this control prediction, a region in which the sun is reflected is first masked to be set a region from which a characteristic point is not extracted, and then a characteristic point is extracted to estimate a self-location and a posture. This results in an improvement in the accuracy in estimating a self-location and a posture using an image.

Next, the control related to assignment of weights to respective pieces of image information from a plurality of cameras 300, is described.

For example, the control prediction unit 505 predicts control performed such that, upon estimating a self-location and a posture using an image, image information from a camera 300 that captures an image in which the sun is reflected, is lightly weighted, and image information from a camera 300 other than the camera 300 capturing an image in which the sun is reflected, is heavily weighted.

In the vehicle 10, on the basis of information regarding this control prediction, an image acquired by a camera 300 that captures an image in which the sun is not reflected, is primarily used to estimate a self-location and a posture. This results in an improvement in the accuracy in estimating a self-location and a posture using an image.

[Control Prediction Processing]

Figure 6:
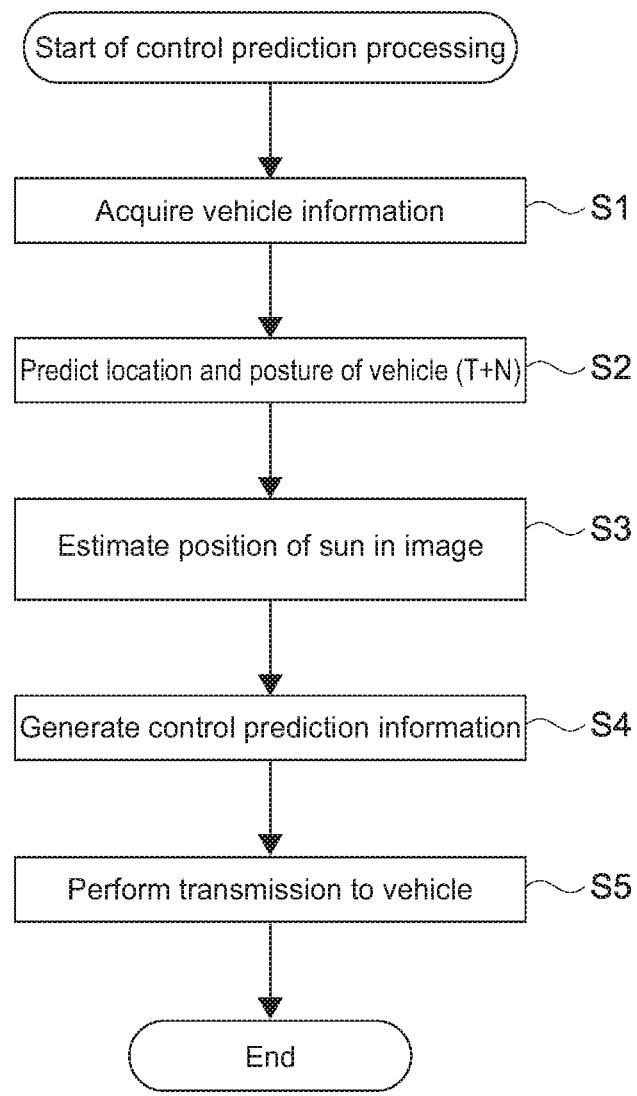
FIG. 6 is a flowchart describing processing of generating a control signal in the image processing apparatus.
Figure 7:
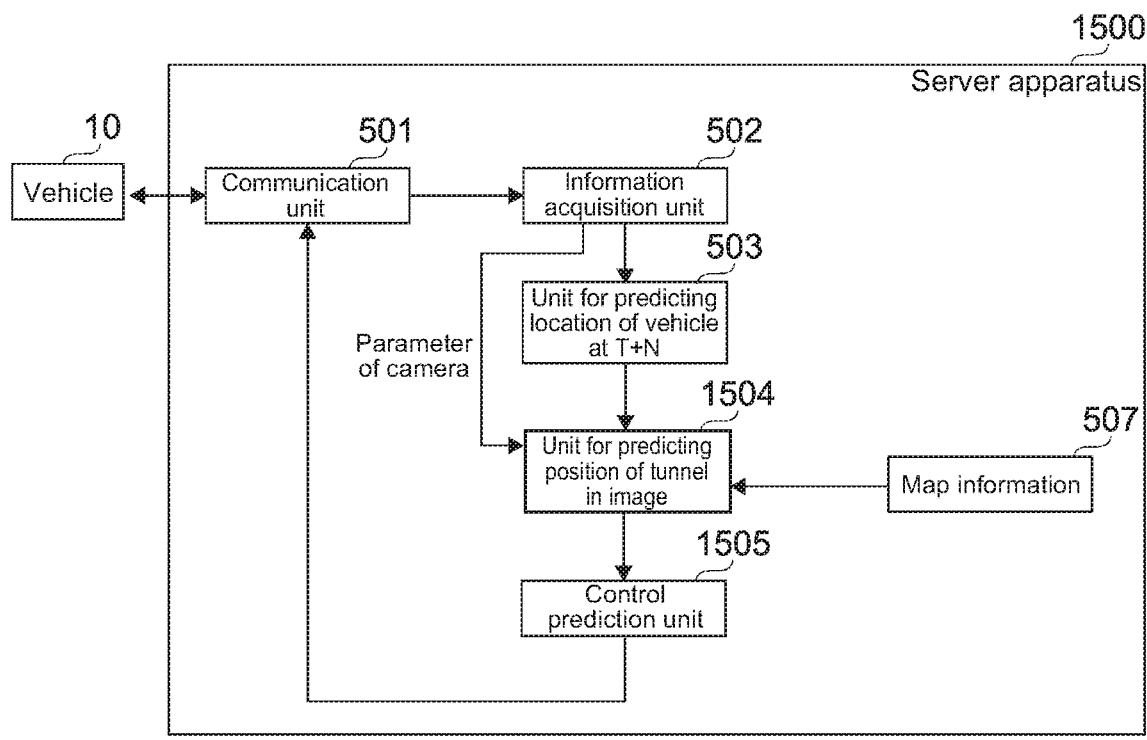
FIG. 7 is a block diagram of a functional configuration of a server apparatus in a sensing-device control system according to a second embodiment of the present technology.

FIG. 6 illustrates a flow of control prediction processing performed in the server apparatus 500 to generate control prediction information regarding prediction of control performed with respect to the sensing device. S represents Step.

When the control prediction processing is started, the information acquisition unit 502 acquires, from the vehicle 10 and through the communication unit 501, information regarding the vehicle 10 such as parameter information regarding a parameter of the camera 300, information regarding a location and a posture of the vehicle 10, and information regarding a state of the vehicle 10 (S1).

Next, the unit 503 for predicting a location and a posture at T+N predicts a location and a posture of the vehicle 10 at T+N on the basis of the information regarding a location and a posture of the vehicle 10 at a time T and the vehicle state information of the vehicle 10 at the time T that are output from the information acquisition unit 502 (S2).

Next, the unit 504 for predicting a position of the sun in an image predicts a position of the sun in an image predicted to be captured by the camera 300 at T+N, on the basis of the parameter information of the camera 300, information regarding the location and the posture of the vehicle at T+N, the information 506 regarding a date and time/weather, and the map information 507 (S3).

Next, on the basis of information regarding the predicted position of the sun in the image, the control prediction unit 505 predicts control performed with respect to the sensing device, and generates control prediction information (a control prediction signal) (S4).

Next, the communication unit 501 transmits the generated control prediction information to the vehicle 10 (S5).

The server apparatus 500 includes hardware, such as a central processing unit (CPU), a read only memory (ROM), a random access memory (RAM), and a hard disk drive (HDD), that is necessary for a configuration of a computer.

In the server apparatus 500, the above-described control prediction processing to generate control prediction information regarding prediction of control performed with respect to the sensing device is performed by loading, into the RAM, a program stored in the ROM and executing the program.

As described above, in the control system 1 according to the present embodiment, control performed with respect to the camera 300 and the self-location estimation system 200 that are installed in the vehicle 10 such that an impact due to the reflection of the sun in an image captured at T+N is reduced, is predicted on the basis of information regarding a location and a posture of the vehicle 10 at a time T, the map information 507, and the information 506 regarding a date and time/weather.

In the vehicle 10, control performed with respect to the camera 300 and the self-location estimation system 200 that are installed in the vehicle 10 is performed on the basis of information regarding this control prediction. Thus, an image that is proper for a state of the vehicle at T+N and in which an impact due to the reflection of the sun, a disturbance factor, is reduced, can be obtained at T+N without a time lag. This results in obtaining a highly robust control system.

Second Embodiment

[Example of Configuration of Control System]

In the present embodiment, the description is made taking a tunnel as an example of a disturbance factor.

FIG. 1 is the block diagram of an example of a schematic functional configuration of a control system 1000 for the sensing device to which the present technology is applicable.

Figure 8:
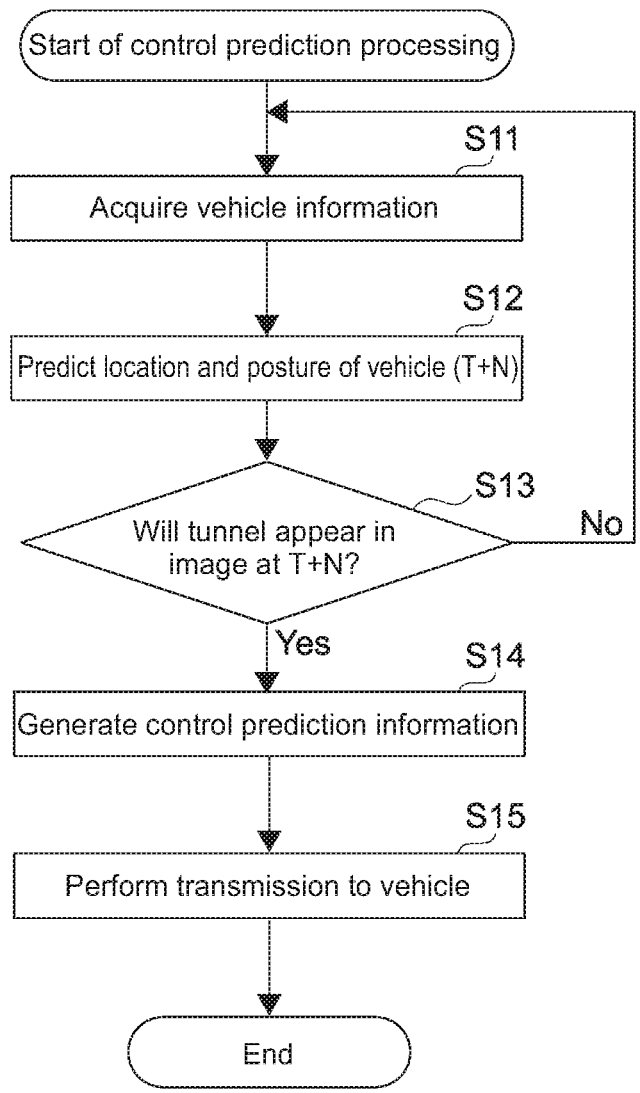
FIG. 8 is a flowchart describing processing of generating a control signal in an image processing apparatus according to the second embodiment.

FIG. 8 is a block diagram of a functional configuration of a server apparatus (an information processing apparatus) in the control system 1000.

In the following description, the same structural element as the first embodiment may be denoted by the same reference symbol and a description thereof may be omitted.

The control system 1000 includes the vehicle control system 100 that is installed in the vehicle 10 that is a mobile object, and a server apparatus 1500 that serves as an information processing apparatus. The vehicle control system 100 and the server apparatus 1500 are capable of communicating with each other, for example, through a wireless communication network.

The server apparatus 1500 includes the communication unit 501, the information acquisition unit 502, the unit 503 for predicting a location and a posture of a vehicle at T+N, a unit 1504 for predicting a position of a disturbance factor (a tunnel) in an image (hereinafter referred to as a unit for predicting a position of a tunnel in an image), and a control prediction unit 1505.

The information acquisition unit 502 acquires, from the vehicle 10 and through the communication unit 501, parameter information regarding a parameter of the camera 300, information regarding a location and a posture of the vehicle 10, and vehicle state information of the vehicle 10.

The parameter information regarding a parameter of the camera 300 is output to the unit 504 for predicting a position of a tunnel in an image.

In the present embodiment, the unit 1504 for predicting a position of a tunnel in an image predicts a position of a tunnel, a disturbance factor, in an image.

The unit 1504 for predicting a position of a tunnel in an image predicts a position of a tunnel in an image captured at T+N, on the basis of information regarding the predicted self-location and posture of the vehicle 10 at T+N, and the map information 507. Tunnel-position-prediction information is output to the control prediction unit 1505. The map information 507 includes tunnel position information.

On the basis of the input information regarding the position of the tunnel in the image, the control prediction unit 1505 predicts control performed with respect to the sensing device. Control prediction information regarding the control predicted by the control prediction unit 1505 is transmitted to the vehicle 10 through the communication unit 501.

The control performed with respect to the sensing device includes control performed with respect to the camera 300, control performed in the self-location estimation system 200 with respect to the sensing device, and control performed with respect to both the camera 300 and the self-location estimation system 200.

The control performed with respect to the camera 300 includes an exposure control and a photometry-region control.

The control prediction unit 1505 predicts an exposure control performed with respect to the camera 300 at T+N, on the basis of a result of the prediction of the position of the tunnel in the image captured at T+N. Information regarding the control prediction is transmitted to the vehicle 10. An exposure control with respect to the camera 300 is performed in the vehicle 10 on the basis of the transmitted information. This is an exposure condition upon performing image-capturing at T+N.

For example, an exposure control such as reducing a shutter speed and increasing a gain is predicted such that a dark image is not obtained and the inside of a tunnel appears in a proper image, since it becomes dark in the tunnel.

Further, the control prediction unit 1505 predicts a photometry-region control performed with respect to the camera 300 at T+N, on the basis of the result of the prediction of a position of a tunnel in the image captured at T+N. Information regarding the control prediction is transmitted to the vehicle 10, and the photometry-region control with respect to the camera 300 is performed on the basis of the transmitted information. This is a photometry-region condition upon performing image-capturing at T+N.

For example, when there is some distance between an entrance of a tunnel and the vehicle 10 before the vehicle 10 enters the tunnel, the control prediction unit 1505 predicts control performed such that a region other than a region inside the tunnel is set to be a photometry region and such that the region other than the region inside the tunnel appears in a proper image although a region, in the image, in which the tunnel is situated exhibits blocked-up shadows. In other words, the control prediction unit 1505 predicts control performed such that an image based on brightness outside the tunnel and not brightness inside the tunnel, is obtained.

Likewise, when an exit of the tunnel appears in an image in a state of the vehicle being situated inside the tunnel and when the vehicle gets close to the exit of the tunnel to some extent, the control prediction unit 1505 predicts control performed such that the region other than the region inside the tunnel is set to be a photometry region.

When the vehicle 10 gets close to the entrance of the tunnel and when the vehicle 10 gets close to the tunnel by a certain distance or more, the control prediction unit 1505 predicts control performed such that the region inside the tunnel is set to be a photometry region and such that the inside of the tunnel appears in a proper image. In other words, the control prediction unit 1505 predicts control performed such that an image based on brightness inside the tunnel is obtained.

Likewise, when the exit of the tunnel does not yet appear in an image in a state of the vehicle being situated inside the tunnel, or when the exit of the tunnel appears in the image in the state of the vehicle being situated inside the tunnel, but the vehicle is still distant from the exit of the tunnel, the control prediction unit 1505 predicts control performed such that the region inside the tunnel is set to be a photometry region.

With respect to control performed such that a region outside a tunnel is set to be a photometry region and control performed such that a region inside the tunnel is set to be the photometry region, which of the controls is to be selected may be determined, for example, depending on the proportion of a region, in an image, in which the tunnel appears.

Further, with respect to an image captured when a region outside a tunnel is set to be a photometry region and an image captured when a region inside the tunnel is set to be the photometry region, the control prediction unit 1505 predicts control performed such that the two images are interpolated so that there is not a sharp change between the images.

Note that, when a region outside a tunnel is set to be a photometry region, the control according to the first embodiment described above that is performed with respect to the camera or the self-location estimation system on the basis of a position of the sun, is performed, or control according to a third embodiment described later that is performed with respect to the camera or the self-location estimation system on the basis of a shadow of a structure, is performed.

This makes it possible to perform image-capturing in the vehicle 10 under a photometry condition or an exposure condition that is proper for a state at T+N.

The control performed in the self-location estimation system 200 with respect to the sensing device includes control that is performed upon estimating a self-location and a posture and is related to assignment of weights to image information and vehicle-state detection information, and control that is performed upon estimating the self-location and the posture and is related to assignment of weights to pieces of image information that are respectively acquired from a plurality of cameras 300.

The control prediction unit 1505 predicts how image information and vehicle-state detection information are respectively weighted in the self-location estimation system 200 to be used for estimating a location of the vehicle 10.

For example, since it is dark in a tunnel, sight of a characteristic point may be lost or the characteristic point may be falsely recognized when a self-location and a posture are estimated in the self-location estimation system 200 using image information. In such a case, the control prediction unit 1505 predicts control performed such that, upon estimating a self-location and a posture in the self-location estimation system 200, a result of the estimation performed using image information is lightly weighted and a result of the estimation performed using vehicle-state detection information is heavily weighted.

Since a self-location and a posture are estimated in the vehicle 10 on the basis of information regarding this control prediction, there is an improvement in the accuracy in estimating a self-location and a posture of the vehicle 10.

Further, the control prediction unit 1505 predicts control performed with respect to how respective pieces of image information acquired by a plurality of cameras 300 are weighted in the self-location estimation system 200 to be used for estimating a location and a posture of the vehicle 10. Examples of the control with respect to the assignment of weights to the camera 300 includes selection of the camera 300 used upon estimating a self-location and a posture.

For example, control is predicted that is performed such that image information regarding an image captured by the camera 300 oriented toward a tunnel is not used or is lightly weighted.

Next, the control performed with respect to both the camera 300 and the self-location estimation system 200 is described.

The control prediction unit 1505 predicts control performed such that the camera 300 performs image-capturing alternately in a first mode and in a second mode for each frame. In addition, the control prediction unit 1505 predicts control performed with respect to which of an image captured in the first mode and an image captured in the second mode is used to estimate a self-location at T+N in the self-location estimation system 200.

Information regarding the control prediction is transmitted to the vehicle 10. In the vehicle 10, a self-location and a posture of the vehicle 10 are estimated in the self-location estimation system 200 on the basis of this information.

The first mode is an image-capturing mode when a region other than a region inside a tunnel is set to be a photometry region. In this mode, setting is performed such that the region other than the region inside the tunnel appears in an image captured with an adequate exposure although a region, in the image, in which the tunnel is situated exhibits blocked-up shadows.

The second mode is an image-capturing mode when the region inside the tunnel is set to be the photometry region. In this mode, setting is performed such that the inside of the tunnel appears in the image captured with the adequate exposure. In the second mode, control such as reducing a shutter speed and increasing a gain is performed.

A pattern of a shutter speed and a gain is switched between the first mode and the second mode.

Processing of estimating a self-location and a posture of the vehicle 10 is performed in the vehicle 10 on the basis of control prediction information that includes image information and information that indicates which of an image captured in the first mode and an image captured in the second mode is used upon estimating a self-location, the image information being information regarding an image obtained by performing image-capturing alternately in the first mode and in the second mode for each frame.

In the case of processing of estimating a self-location and a posture that is performed on the basis of control prediction information indicating use of an image captured in the first mode, an image captured in the first mode is extracted from the acquired image information in the self-location estimation system 200, and the processing of estimating a self-location and a posture is performed on the basis of the extracted image.

On the other hand, in the case of processing of estimating a self-location and a posture that is performed on the basis of control prediction information indicating use of an image captured in the second mode, an image captured in the second mode is extracted from the acquired image information in the self-location estimation system 200, and the processing of estimating a self-location and a posture is performed on the basis of the extracted image.

Note that, here, the example in which the control prediction information includes information that indicates which of an image in the first mode and an image in the second mode is used to perform processing of estimating a self-location and a posture, and one of an image captured in the first mode and an image captured in the second mode is used upon estimating a self-location, has been described.

In addition, the control prediction information may include information indicating how a result of the processing of estimating a self-location and a posture performed using an image captured in the first mode, and a result of the processing of estimating a self-location and a posture performed using an image captured in the second mode are respectively weighted to be integrated with each other.

In the case of this control prediction information, processing of estimating a self-location and a posture is performed for each mode in the self-location estimation system 200, that is, processing of estimating a self-location and a posture is performed using image information regarding an image captured in the first mode, and processing of estimating a self-location and a posture is performed using image information regarding an image captured in the second mode. Then, processing of estimating a self-location and a posture is performed in the self-location estimation system 200 using a result obtained by assigning weights to processing results in the respective modes and integrating the weighted processing results.

[Control Prediction Processing]

FIG. 8 illustrates a flow of control prediction processing performed in the server apparatus 1500 to generate control prediction information regarding prediction of control performed with respect to the sensing device.

When the control prediction processing is started, the information acquisition unit 502 acquires, from the vehicle 10 and through the communication unit 501, parameter information regarding a parameter of the camera 300, information regarding a location and a posture of the vehicle 10 at a time T, and vehicle state information of the vehicle 10 at the time T (S11).

Next, the unit 503 for predicting a location and a posture at T+N predicts a location and a posture of the vehicle 10 at T+N on the basis of the information regarding a location and a posture of the vehicle 10 at the time T and the vehicle state information of the vehicle 10 at the time T that are output from the information acquisition unit 502 (S12).

Next, the unit 1504 for predicting a position of a tunnel in an image predicts a position of a tunnel in an image predicted to be captured by the camera 300 at T+N, on the basis of the parameter information of the camera 300, information regarding the position and the posture of the vehicle at T+N, and the map information 507, and predicts whether the tunnel will appear in the image (S13).

When determination performed in S13 is No, the process returns to S11 to be repeatedly performed.

When the determination performed in S13 is Yes, the process moves on to S14.

In S14, on the basis of tunnel position information, the control prediction unit 1505 predicts control performed with respect to the sensing device, and generates control prediction information (a control prediction signal).

Next, the communication unit 501 transmits the generated control prediction information to the vehicle 10 (S15).

The server apparatus 1500 includes hardware, such as a CPU, a ROM, a RAM, and an HDD, that is necessary for a configuration of a computer.

In the server apparatus 1500, the above-described control prediction processing to generate control prediction information regarding prediction of control performed with respect to the sensing device is performed by loading, into the RAM, a program stored in the ROM and executing the program.

As described above, in the control system 1000 according to the present embodiment, control performed with respect to the camera 300 and the self-location estimation system 200 that are installed in the vehicle 10 such that an impact due to the appearance of a tunnel in an image captured at T+N is reduced, is predicted on the basis of information regarding a location and a posture of the vehicle 10 at a time T, and the map information 507.

In the vehicle 10, control performed with respect to the camera 300 and the self-location estimation system 200 that are installed in the vehicle 10 is performed on the basis of information regarding this control prediction. Thus, an image that is proper for a state of the vehicle at T+N and in which an impact due to the appearance of a tunnel, a disturbance factor, is reduced, can be obtained at T+N without a time lag. This results in obtaining a highly robust control system.

Third Embodiment

In the present embodiment, the description is made taking a shadow of a structure that is a stationary object such as an architectural structure as an example of a disturbance factor. In the following description, a building is taken as an example of the structure.

FIG. 1 is the block diagram of an example of a schematic functional configuration of a control system 2000 for the sensing device to which the present technology is applicable.

Figure 9:
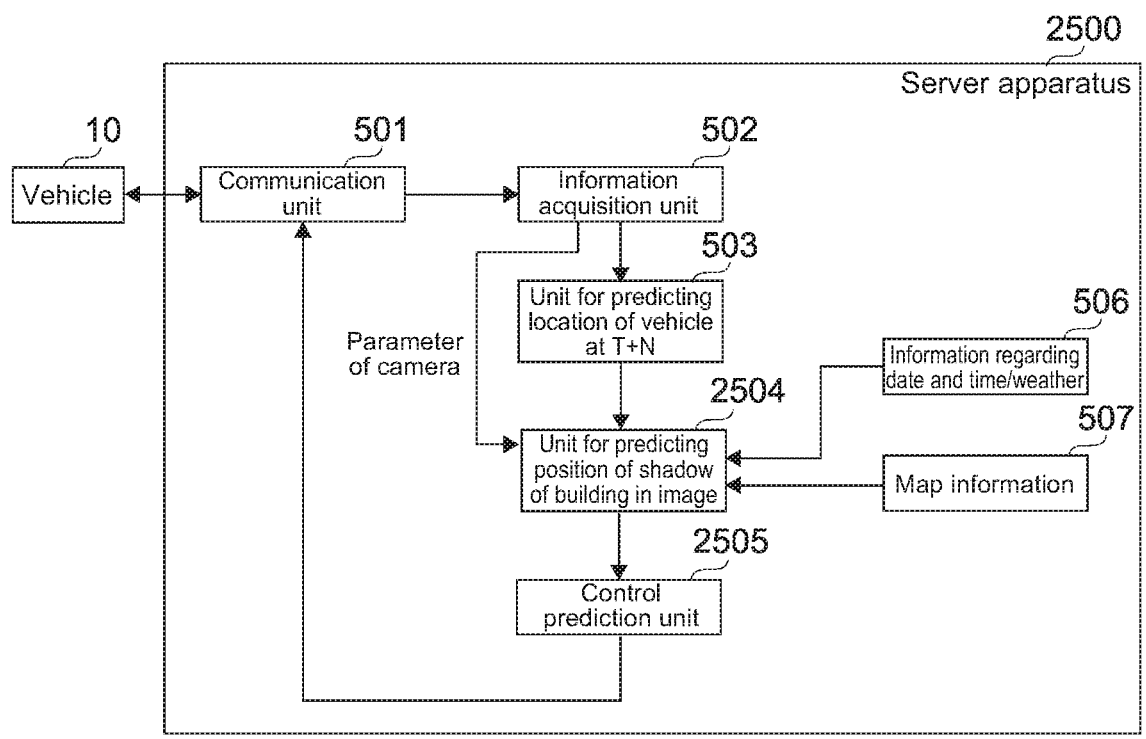
FIG. 9 is a block diagram of a functional configuration of an image processing apparatus in a sensing-device control system according to a third embodiment of the present technology.

FIG. 9 is a block diagram of a functional configuration of a server apparatus 2500 that serves as an information processing apparatus in the control system 2000.

In the following description, the same structural element as the first embodiment may be denoted by the same reference symbol and a description thereof may be omitted.

The control system 2000 includes the vehicle control system 100 that is installed in the vehicle 10 that is a mobile object, and the server apparatus 2500 that serves as an information processing apparatus. The vehicle control system 100 and the server apparatus 2500 are capable of communicating with each other, for example, through a wireless communication network.

The server apparatus 2500 includes the communication unit 501, the information acquisition unit 502, the unit 503 for predicting a location and a posture of a vehicle at T+N, a unit 2504 for predicting a position of a disturbance factor (a shadow of a building) in an image (hereinafter referred to as a unit for predicting a position of a shadow of a building in an image), and a control prediction unit 2505.

The information acquisition unit 502 acquires, from the vehicle 10 and through the communication unit 501, parameter information regarding a parameter of the camera 300, information regarding a location and a posture of the vehicle 10, and vehicle state information of the vehicle 10.

The parameter information regarding a parameter of the camera 300 is output to the unit 2504 for predicting a position of a shadow of a building in an image.

The unit 2504 for predicting a position of a shadow of a building in an image predicts a position of a shadow of a building, a disturbance factor, in an image.

The unit 2504 for predicting a position of a shadow of a building in an image predicts a position of a shadow of a building in an image predicted to be captured by the camera 300 at T+N, on the basis of the parameter information of the camera 300, information regarding the self-location and the posture of the vehicle 10 at T+N, the information 506 regarding a date and time/weather, and the map information 507.

Specifically, first, using the date-and-time information, information regarding the predicted self-location and posture of the vehicle 10 at T+N, and the map information 507, the unit 2504 for predicting a position of a shadow of a building in an image calculates the elevation (elevation angle) and azimuth of the sun at T+N. The map information 507 includes building position information.

Next, the unit 2504 for predicting a position of a shadow of a building in an image determines whether the sun will be out on the basis of the weather information regarding weather in the location of the vehicle 10 at T+N.

For example, when the unit 2504 for predicting a position of a shadow of a building in an image has determined that the sun will be out in clear weather, the unit 2504 for predicting a position of a shadow of a building in an image predicts a position of a shadow of a building in an image captured by the camera 300 at T+N, on the basis of information regarding the elevation and azimuth of the sun at T+N, the information regarding the self-location and posture of the vehicle 10, the parameter information of the camera 300, and the map information 507.

A result of the prediction performed by the unit 2504 for predicting a position of a shadow of a building in an image with respect to the position of a shadow of a building in an image, is output to the control prediction unit 2505.

On the basis of the input information regarding a position of a shadow of a building in an image, the control prediction unit 2505 predicts control performed with respect to the sensing device. Control prediction information regarding the control predicted by the control prediction unit 2505 is transmitted to the vehicle 10 through the communication unit 501.

The control performed with respect to the sensing device includes control performed with respect to the camera 300, control performed in the self-location estimation system 200 with respect to the sensing device, and control performed with respect to both the camera 300 and the self-location estimation system 200.

The control performed with respect to the camera 300 includes an exposure control and a photometry-region control.

On the basis of information regarding a position of a shadow of a building in an image at T+N, the control prediction unit 2505 predicts control performed with respect to exposure, such as adjustment of a shutter speed and adjustment of a gain of an image signal.

For example, when a shadow of a building appears in an image, the control prediction unit 2505 predicts an exposure control such as reducing a shutter speed and increasing a gain, since the image is likely to become dark.

Information regarding the control prediction is transmitted to the vehicle 10. An exposure control with respect to the camera 300 is performed in the vehicle 10 on the basis of the transmitted control prediction information, and this is an exposure condition upon performing image-capturing at T+N.

This enables the vehicle 10 to obtain an image that is captured with an adequate exposure and is proper for a state at T+N.

Further, when a self-location and a posture are estimated using an image in the self-location estimation system 200, it is possible to use an image that is captured with an adequate exposure and in which sight of a characteristic point is less likely to be lost, and this results in being able to improve the accuracy in estimating a self-location and a posture.

On the basis of the information regarding a position of a shadow of a building in an image at T+N, the control prediction unit 2505 predicts control performed with respect to a photometry region. Control prediction information regarding the control predicted by the control prediction unit 2505 is transmitted to the vehicle 10 through the communication unit 501. A photometry-region control with respect to the camera 300 is performed in the vehicle 10 on the basis of the transmitted control prediction information, and this is a photometry condition upon performing image-capturing at T+N.

For example, when a shadow of a building appears in an image, the control prediction unit 2505 predicts the photometry-region control performed such that a region, in the image, in which the shadow of the building appears is excluded from a photometry region, since the region in which the shadow of the building appears becomes dark.

Specifically, as long as there is some distance or more between a shadow of a building and the vehicle, the control prediction unit 2505 predicts control performed such that a region other than a region of the shadow of the building in an image is set to be a photometry region and such that the region other than the region of the shadow of the building appears in a proper image although the region of the shadow of the building exhibits blocked-up shadows.

On the other hand, when a shadow of a building and the vehicle 10 get close to each other by a certain distance or more, the control prediction unit 2505 predicts control performed such that the region of the shadow of the building is set to be the photometry region and such that a shaded region appears in a proper image.

Further, with respect to an image captured when a shadow of a building is set to be a photometry region and an image captured when a region other than the shadow of the building is set to be the photometry region, the control prediction unit 2505 predicts control performed such that the two images are interpolated so that there is not a sharp change between the images.

This makes it possible to obtain an image suitable for a state.

Further, a self-location and a posture can be estimated in the self-location estimation system 200 using an image in which sight of a characteristic point is less likely to be lost, and this results in being able to improve the accuracy in estimating a self-location and a posture.

The control performed in the self-location estimation system 200 with respect to the sensing device includes control that is performed upon estimating a self-location and a posture and is related to assignment of weights to image information and vehicle-state detection information, and control that is performed upon estimating the self-location and the posture and is related to assignment of weights to respective pieces of image information that are respectively acquired from a plurality of cameras 300.

On the basis of information regarding a position of a shadow of a building in an image at T+N, the control prediction unit 2505 predicts how image information and vehicle-state detection information are respectively weighted in the self-location estimation system 200 to be used for estimating a self-location and a posture of the vehicle 10.

For example, when the control prediction unit 2505 predicts that a screen will become dark due to shadow of a building and there will be a decrease in the accuracy in extracting a characteristic point, the control prediction unit 2505 predicts control performed such that, upon estimating a self-location and a posture in the self-location estimation system 200, a result of the estimation performed using image information is lightly weighted and a result of the estimation performed using vehicle-state detection information is heavily weighted.

Information regarding the control prediction is transmitted to the vehicle 10. Since a self-location and a posture are estimated in the vehicle 10 on the basis of information regarding this control prediction, there is an improvement in the accuracy in estimating a self-location and a posture.

Further, the control prediction unit 2505 predicts control performed with respect to how respective pieces of image information acquired by a plurality of cameras 300 are weighted in the self-location estimation system 200 to be used for estimating a location and a posture of the vehicle.

For example, control is predicted that is performed such that image information regarding an image captured by the camera 300 oriented toward a shadow of a building is not used or is lightly weighted.

Next, the control performed with respect to both the camera 300 and the self-location estimation system 200 is described.

The control prediction unit 2505 predicts control performed such that the camera 300 performs image-capturing alternately in a first mode and in a second mode for each frame. In addition, the control prediction unit 2505 predicts control performed with respect to which of an image captured in the first mode and an image captured in the second mode is used for estimating a self-location at T+N in the self-location estimation system 200, or control performed with respect to how a result of estimation of the self-location at T+N that is performed using the image captured in the first mode, and a result of estimation of the self-location at T+N that is performed using the image captured in the second mode are respectively weighted to be integrated with each other for estimating a self-location at T+N in the self-location estimation system 200.

Information regarding the control prediction is transmitted to the vehicle 10. In the vehicle 10, on the basis of this information, an image is captured by the camera 300 and, further, a self-location and a posture of the vehicle 10 are estimated in the self-location estimation system 200.

The first mode is an image-capturing mode when a region other than a region of a shadow of a building is set to be a photometry region. In this mode, setting is performed such that the region other than the region of the shadow of the building appears in an image captured with an adequate exposure although the region of the shadow of the building in the image exhibits blocked-up shadows.

The second mode is an image-capturing mode when the region of the shadow of the building is set to be the photometry region. In this mode, setting is performed such that the region of the shadow of the building appears in the image captured with the adequate exposure. In the second mode, an exposure control such as reducing a shutter speed and increasing a gain is performed.

A pattern of a shutter speed and a gain is switched between the first mode and the second mode.

Processing of estimating a self-location and a posture of the vehicle 10 is performed in the vehicle 10 on the basis of control prediction information, the control prediction information including image information and information that indicates which of an image captured in the first mode and an image captured in the second mode is used upon estimating a self-location, or indicates how results of estimating a self-location and a posture in the respective modes are weighted to be integrated with each other, the image information being information regarding an image obtained by performing image-capturing alternately in the first mode and in the second mode for each frame, the results of estimating a self-location and a posture in the respective modes being obtained using images captured in the two modes.

In the case of processing of estimating a self-location and a posture that is performed on the basis of control prediction information indicating use of an image captured in the first mode, an image captured in the first mode is extracted from the acquired image information in the self-location estimation system 200, and the processing of estimating a self-location and a posture is performed on the basis of the extracted image.

In the case of processing of estimating a self-location and a posture that is performed on the basis of control prediction information indicating use of an image captured in the second mode, an image captured in the second mode is extracted from the acquired image information in the self-location estimation system 200, and the processing of estimating a self-location and a posture is performed on the basis of the extracted image.

In the case of processing of estimating a self-location and a posture that is performed on the basis of control prediction information indicating use of a result obtained by assigning weights to results of estimating a self-location and a posture in the respective modes and integrating the weighted results, processing of estimating a self-location and a posture is performed for each mode in the self-location estimation system 200, that is, processing of estimating a self-location and a posture is performed using image information regarding an image captured in the first mode, and processing of estimating a self-location and a posture is performed using image information regarding an image captured in the second mode. Then, processing of estimating a self-location and a posture is performed in the self-location estimation system 200 using a result obtained by assigning weights to processing results in the respective modes and integrating the weighted processing results.

[Control Prediction Processing]

Figure 10:
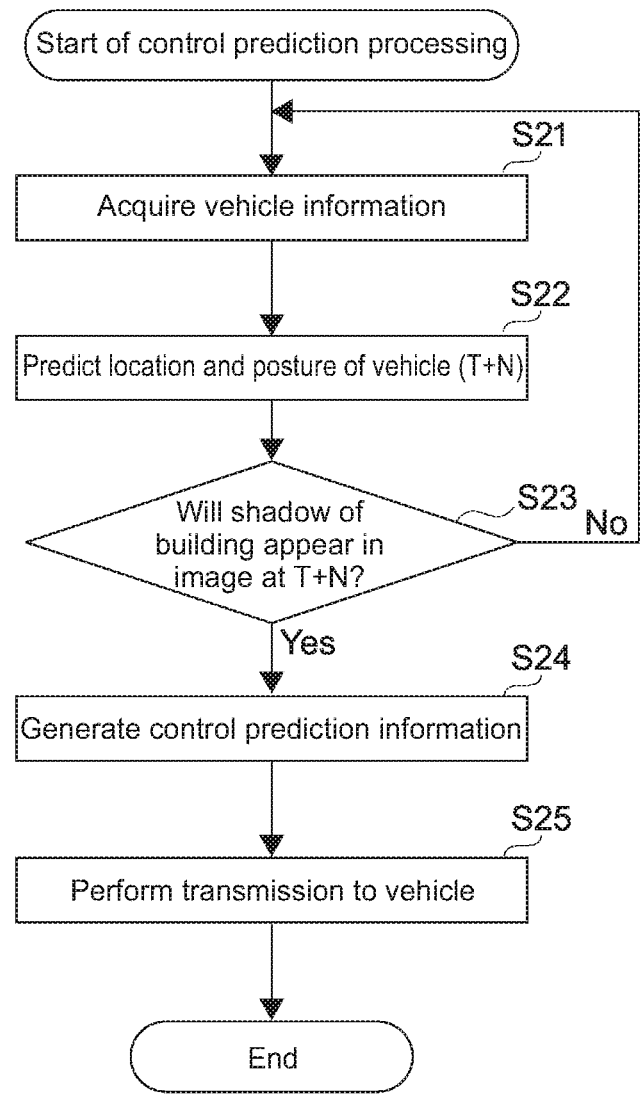
FIG. 10 is a flowchart describing processing of generating a control signal in the image processing apparatus according to the third embodiment.

FIG. 10 illustrates a flow of control prediction processing performed in the server apparatus 2500 to generate control prediction information regarding prediction of control performed with respect to the sensing device.

When the control prediction processing is started, the information acquisition unit 502 acquires, from the vehicle 10 and through the communication unit 501, parameter information regarding a parameter of the camera 300, information regarding a location and a posture of the vehicle 10, and vehicle state information of the vehicle 10 (S21).

Next, the unit 503 for predicting a location and a posture at T+N predicts a location and a posture of the vehicle 10 at T+N on the basis of information regarding a location and a posture of the vehicle 10 at a time T and vehicle state information of the vehicle 10 at the time T that are output from the information acquisition unit 502 (S22).

Next, the unit 2504 for predicting a position of a shadow of a building in an image predicts a position of a shadow of a building in an image predicted to be captured by the camera 300 at T+N, on the basis of the parameter information of the camera 300, information regarding the position and the posture of the vehicle at T+N, the information 506 regarding a date and time/weather, and the map information 507, and predicts whether the shadow of the building will appear in an image (S23).

When determination performed in S23 is No, the process returns to S21 to be repeatedly performed.

When the determination performed in S23 is Yes, the process moves on to S24.

In S24, on the basis of information regarding a position of a shadow of a building, the control prediction unit 2505 predicts control performed with respect to the sensing device, and generates control prediction information (a control prediction signal).

Next, the communication unit 501 transmits the generated control prediction information to the vehicle 10 (S25).

The server apparatus 2500 includes hardware, such as a CPU, a ROM, a RAM, and an HDD, that is necessary for a configuration of a computer.

In the server apparatus 2500, the above-described control prediction processing to generate control prediction information regarding prediction of control performed with respect to the sensing device is performed by loading, into the RAM, a program stored in the ROM and executing the program.

As described above, in the control system 2000 according to the present embodiment, control performed with respect to the camera 300 and the self-location estimation system 200 that are installed in the vehicle 10 such that an impact due to the appearance of a shadow of a structure in an image captured at T+N is reduced, is predicted on the basis of information regarding a location and a posture of the vehicle 10 at a time T, the map information 507, and the information 506 regarding a date and time/weather.

In the vehicle 10, control performed with respect to the camera 300 and the self-location estimation system 200 that are installed in the vehicle 10 is performed on the basis of information regarding this control prediction. Thus, an image that is proper for a state of the vehicle at T+N and in which an impact due to the appearance of a shadow of a structure, a disturbance factor, is reduced, can be obtained at T+N without a time lag. This results in obtaining a highly robust control system.

Other Embodiments

Embodiments of the present technology are not limited to the embodiments described above, and various modifications may be made thereto without departing from the spirit of the present technology.

For example, in the embodiments described above, the example in which control prediction information generated by the server apparatus 500 (1500, 2500) is transmitted to the vehicle 10 in which a camera acquiring image information is installed, has been described. However, the control prediction information may be transmitted to another vehicle other than the vehicle 10. Here, the vehicle 10 is referred to as the own vehicle 10 in order to distinguish the own vehicle 10 from the other vehicle.

The other vehicle, which is a second vehicle, follows the same route as a route along which the own vehicle 10, which is a first vehicle, travels, and the other vehicle passes through a certain location at a time T+N', the certain location being the same as a location through which the vehicle 10 passes at the time T+N (N'>N), the time T+N' being a time after only a short period of time from the time T+N.

Control prediction information regarding prediction of control performed at T+N with respect to the vehicle 10 is transmitted to the other vehicle, the prediction of the control being performed by the server apparatus 500 (1500, 2500).

When the other vehicle reaches the same location as a location in which the vehicle 10 is predicted to exist at T+N, processing with respect to the sensing device that is similar to the processing performed in the vehicle 10 and described in the respective embodiments above, is performed in the other vehicle, on the basis of the received control prediction information.

The server apparatus 500 (1500, 2500) only acquires, from the other vehicle, information regarding a location and a posture of the other vehicle. As control prediction information regarding prediction of control performed at the time T+N' with respect to the sensing device of the other vehicle, the server apparatus 500 (1500, 2500) transmits, to the other vehicle, control prediction information regarding prediction of control performed at T+N with respect to the own vehicle 10.

In other words, on the basis of information regarding a location and a posture of the vehicle 10 at the time T that is acquired by the information acquisition unit 502, and on the basis of map information, the control prediction unit 505 (1505, 2505) sets, to be prediction of control performed with respect to the sensing device of the other vehicle, prediction of control performed at T+N with respect to the sensing device of the own vehicle 10, the prediction of control performed at T+N with respect to the sensing device of the own vehicle 10 being predicted by the control prediction unit 505 (1505, 2505).

As described above, similar control prediction information may be shared by a plurality of vehicles.

Further, in the embodiments described above, the example in which the control prediction information includes control prediction information regarding prediction of control performed with respect to the camera, control prediction information regarding prediction of control performed in the self-location estimation system with respect to the sensing device, and control prediction information regarding prediction of control performed with respect to both the camera and the self-location estimation system, has been described. However, one of these pieces of control prediction information may be used, or a combination thereof may be used.

Furthermore, in the embodiments described above, the example of applying the present technology in order to capture an image used in the self-location estimation system, has been described, but the application is not limited to this. For example, the present technology may be used to perform an exposure control and a photometry control that are performed with respect to the camera used to capture a video stored in a dashcam, and this makes it possible to obtain a video that is less affected by a disturbance factor.

Moreover, the control systems according to the respective embodiments described above may be combined.

Further, in the embodiments described above, a system refers to a set of a plurality of structural elements (such as devices and modules (components)), and whether all of the structural elements are in a single housing is no object. Thus, a plurality of devices accommodated in separate housings and connected to one another through a network, and a single device in which a plurality of modules is accommodated in a single housing are both systems.

Note that the present technology may also take the following configurations.

(1) An information processing apparatus including:

an information acquisition unit that acquires information regarding a location and a posture of a first mobile object that includes a sensing device; and a control prediction unit that predicts control performed with respect to the sensing device, on the basis of the information regarding the location and the posture and map information, the information regarding the location and the posture being acquired by the information acquisition unit.

(2) The information processing apparatus according to (1), in which the sensing device includes an image-capturing device, the information processing apparatus further includes a unit for predicting a location and a posture of a mobile object that predicts the location and the posture of the first mobile object on the basis of the information regarding the location and the posture, the information regarding the location and the posture being acquired by the information acquisition unit, and a unit for predicting a position of a disturbance factor that predicts a position of a disturbance factor in an image captured by the image-capturing device, on the basis of the map information and a result of the prediction performed by the unit for predicting a location and a posture of a mobile object, and on the basis of a result of the prediction performed by the unit for predicting a position of a disturbance factor, the control prediction unit predicts control performed with respect to the image-capturing device.

(3) The information processing apparatus according to (2), in which the control prediction unit predicts an exposure control performed with respect to the image-capturing device.

(4) The information processing apparatus according to (2) or (3), in which the control prediction unit predicts a photometry-region control performed with respect to the image-capturing device.

(5) The information processing apparatus according to any one of (1) to (4), in which the sensing device includes an image-capturing device, the first mobile object includes a self-location estimation system that estimates the location and the posture of the first mobile object using a characteristic point that is extracted from image information from the image-capturing device, the information processing apparatus further includes a unit for predicting a location and a posture of a mobile object that predicts the location and the posture of the first mobile object on the basis of the information regarding the location and the posture, the information regarding the location and the posture being acquired by the information acquisition unit, and a unit for predicting a position of a disturbance factor that predicts a position of a disturbance factor in an image captured by the image-capturing device, on the basis of the map information and a result of the prediction performed by the unit for predicting a location and a posture of a mobile object, and on the basis of a result of the prediction performed by the unit for predicting a position of a disturbance factor, the control prediction unit predicts control performed with respect to the self-location estimation system.

(6) The information processing apparatus according to (5), in which on the basis of the result of the prediction performed by the unit for predicting a position of a disturbance factor, the control prediction unit predicts a region in which extraction of the characteristic point in the image is not performed in the self-location estimation system.

(7) The information processing apparatus according to (5) or (6), in which the sensing device includes the image-capturing device and a mobile-object-state detection sensor that detects a state of the first mobile object, the first mobile object includes the self-location estimation system that estimates the location and the posture of the first mobile object using at least one of the image information, or mobile-object-state information from the mobile-object-state detection sensor, and on the basis of the result of the prediction performed by the unit for predicting a position of a disturbance factor, the control prediction unit predicts how the image information and the mobile-object-state information are respectively weighted, the image information and the mobile-object-state information being used when the location and the posture of the first mobile object are estimated in the self-location estimation system.

(8) The information processing apparatus according to any one of (5) to (7), in which the sensing device includes a plurality of the image-capturing devices, and on the basis of the result of the prediction performed by the unit for predicting a position of a disturbance factor, the control prediction unit predicts how respective pieces of image information from the plurality of the image-capturing devices are weighted, the respective pieces of image information being used when the location and the posture of the first mobile object are estimated in the self-location estimation system.

(9) The information processing apparatus according to any one of (5) to (8), in which on the basis of the result of the prediction performed by the unit for predicting a position of a disturbance factor, the control prediction unit predicts control performed with respect to the image-capturing device.

(10) The information processing apparatus according to any one of (2) to (9), in which the disturbance factor is the sun, and on the basis of the map information, the result of the prediction performed by the unit for predicting a location and a posture of a mobile object, and sun position information, the unit for predicting a position of a disturbance factor predicts a position of the sun in the image captured by the image-capturing device.

(11) The information processing apparatus according to any one of (2) to (9), in which the disturbance factor is a tunnel, and on the basis of the map information and the result of the prediction performed by the unit for predicting a location and a posture of a mobile object, the unit for predicting a position of a disturbance factor predicts a position of the tunnel in the image captured by the image-capturing device.

(12) The information processing apparatus according to any one of (2) to (9), in which the disturbance factor is a shadow of a structure, and on the basis of the map information, the result of the prediction performed by the unit for predicting a location and a posture of a mobile object, and sun position information, the unit for predicting a position of a disturbance factor predicts a position of the shadow created due to the structure in the image captured by the image-capturing device.

(13) The information processing apparatus according to any one of (1) to (9), in which the information processing apparatus according to claim 1, wherein the information acquisition unit acquires information regarding a location and a posture of a second mobile object that includes a sensing device and is different from the first mobile object, and the control prediction unit sets, to be prediction of control performed with respect to the sensing device of the second mobile object, the prediction of the control performed with respect to the sensing device of the first mobile object, the prediction of the control performed with respect to the sensing device of the first mobile object being performed by the control prediction unit on the basis of the information regarding the location and the posture of the first mobile object and the map information, the information regarding the location and the posture of the first mobile object being acquired by the information acquisition unit.

(14) A mobile object including:

a sensing device; and an acquisition unit that acquires information regarding a self-location and a posture of the mobile object, in which the sensing device is controlled according to control prediction information regarding prediction of control performed with respect to the sensing device, the control performed with respect to the sensing device being predicted on the basis of the information regarding the self-location and the posture and map information, the information regarding the self-location and the posture being acquired by the acquisition unit.

(15) A control system including:
a mobile object that includes a sensing device;
an information acquisition unit that acquires information regarding a location and a posture of the mobile object;
a control prediction unit that predicts control performed with respect to the sensing device, on the basis of the information regarding the location and the posture and map information, the information regarding the location and the posture being acquired by the information acquisition unit; and
a control unit that performs the control with respect to the sensing device on the basis of control prediction information regarding the control prediction performed by the control prediction unit.

(16) An information processing method including:
acquiring information regarding a location and a posture of a mobile object that includes a sensing device; and
predicting control performed with respect to the sensing device, on the basis of the information regarding the location and the posture and map information.

(17) A program that causes an information processing apparatus to perform a process including:
acquiring information regarding a location and a posture of a mobile object that includes a sensing device; and
predicting control performed with respect to the sensing device, on the basis of the information regarding the location and the posture and map information.

REFERENCE SIGNS LIST 1, 1000, 2000 control system
10 vehicle (first mobile object)
102 data acquisition unit (acquisition unit)
200 self-location estimation system
201 control unit of self-location estimation system (control unit)
300 camera (sensing device, image-capturing device)
301 camera control unit (control unit)
400 vehicle-state detection sensor (sensing device, mobile-object-state detection sensor)
500, 1500, 2500 server apparatus (information processing apparatus)
502 information acquisition unit
503 unit for predicting location and posture of vehicle at T+N (unit for predicting location and posture of mobile object)
504 unit for predicting position of sun in image (unit for predicting position of disturbance factor)
505, 1505, 2505 control prediction unit
506 information regarding date and time/weather
507 map information
1504 unit for predicting position of tunnel in image (unit for predicting position of disturbance factor)
2504 unit for predicting position of shadow of building in image (unit for predicting position of disturbance factor)

The invention claimed is:

1. An information processing apparatus, comprising:
a central processing unit (CPU) configured to:
acquire first information regarding a first location and a first posture of a first mobile object, wherein
the first location and the first posture correspond to a first time instant,
the first mobile object includes a first sensing device, and
the first sensing device includes an image-capturing device;
predict a second location and a second posture of the first mobile object based on the first information, wherein
the second location and the second posture correspond to a second time instant, and
the second time instant is subsequent to the first time instant;
predict a position and a location of a disturbance factor in an image based on the predicted second location of the first mobile object at the second time instant, the predicted second posture of the first mobile object at the second time instant, and map information, wherein the image is to be captured by the image-capturing device at the second time instant;
generate, based on the predicted position of the disturbance factor and the predicted location of the disturbance factor in the image, first control prediction information for control of the first sensing device; and
transmit the first control prediction information,
wherein the first sensing device is controlled at the second time instant based on the first control prediction information.

2. The information processing apparatus according to claim 1, wherein the CPU is further configured to predict an exposure control of the image-capturing device.

3. The information processing apparatus according to claim 1, wherein the CPU is further configured to predict photometry-region control of the image-capturing device.

4. The information processing apparatus according to claim 1, wherein
the first mobile object further includes a self-location estimation system that estimates the first location and the first posture of the first mobile object using a characteristic point that is extracted from image information from the image-capturing device,
the CPU is further configured to generate, based on the predicted position of the disturbance factor and the predicted location of the disturbance factor in the image, the first control prediction information to control the self-location estimation system, and
the self-location estimation system is controlled at the second time instant based on the first control prediction information.

5. The information processing apparatus according to claim 4, wherein the CPU is further configured to predict, based on the predicted position of the disturbance factor, a region in which the extraction of the characteristic point in the image is not performed in the self-location estimation system.

6. The information processing apparatus according to claim 4, wherein
the first sensing device further includes a mobile-object-state detection sensor that detects a state of the first mobile object,
the self-location estimation system further estimates the first location and the first posture of the first mobile object based on at least one of the image information, or mobile-object-state information from the mobile-object-state detection sensor, and the CPU is further configured to assign, based on the predicted position of the disturbance factor, a weight to each of the image information and the mobile-object-state information.

7. The information processing apparatus according to claim 4, wherein
the first sensing device further includes a plurality of image-capturing devices,
the plurality of image-capturing devices include the image-capturing device,
the CPU is further configured to assign, based on the predicted position of the disturbance factor, a weight to image information from each image-capturing device of the plurality of image-capturing devices, and
the first location and the first posture of the first mobile object are estimated in the self-location estimation system based on the image information.

8. The information processing apparatus according to claim 4, wherein the CPU is further configured to generate, based on the predicted position of the disturbance factor, the first control prediction information for control of the image-capturing device.

9. The information processing apparatus according to claim 1, wherein
the disturbance factor is the sun, and
the CPU is further configured to predict, based on the map information, the predicted second location of the first mobile object, the predicted second posture of the first mobile object, and sun position information, a position of the sun in the image to be captured by the image-capturing device.

10. The information processing apparatus according to claim 1, wherein
the disturbance factor is a tunnel, and
the CPU is further configured to predict, based on the map information, the predicted second location of the first mobile object, and the predicted second posture of the first mobile object, a position of the tunnel in the image to be captured by the image-capturing device.

11. The information processing apparatus according to claim 1, wherein
the disturbance factor is a shadow of a structure, and
the CPU is further configured to predict, based on the map information, the predicted second location of the first mobile object, the predicted second posture of the first mobile object, and sun position information, a position of the shadow created due to the structure in the image to be captured by the image-capturing device.

12. The information processing apparatus according to claim 1, wherein the CPU is further configured to:
acquire a third location and a third posture of a second mobile object that includes a second sensing device, wherein the second mobile object is different from the first mobile object, and
set, as second control prediction information for control of the second sensing device of the second mobile object, the first control prediction information for the control of the first sensing device of the first mobile object.

13. A mobile object, comprising:
a sensing device; and
circuitry configured to:
acquire information regarding a self-location and a posture of the mobile object, wherein the self-location and the posture of the mobile object correspond to a first time instant;
acquire control prediction information; and
control the sensing device at a second time instant based on the control prediction information,
wherein
the second time instant is subsequent to the first time instant,
the control prediction information is based on the information regarding the self-location and the posture, a location of a disturbance factor in an image, and map information, and
the sensing device is configured to capture the image at the second time instant based on the control prediction information.

14. A control system, comprising:
a mobile object that includes a sensing device and circuitry; and
an information processing device comprising a central processing unit (CPU) configured to:
acquire first information regarding a first location and a first posture of the mobile object,
wherein the first location and the first posture correspond to a first time instant;
predict a second location and a second posture of the mobile object based on the first information, wherein the second location and the second posture correspond to a second time instant, and
the second time instant is subsequent to the first time instant;
predict a position and a location of a disturbance factor in an image based on the predicted second location of the mobile object at the second time instant, the predicted second posture of the mobile object at the second time instant, and map information,
wherein the image is to be captured by the sensing device at the second time instant;
generate, based on the predicted position of the disturbance factor and the predicted location of the disturbance factor in the image, control prediction information for control of the sensing device; and
transmit the control prediction information,
wherein the circuitry is configured to control the sensing device based on the control prediction information.

15. An information processing method, comprising:
acquiring first information regarding a first location and a first posture of a mobile object,
wherein
the first location and the first posture correspond to a first time instant,
the mobile object includes a sensing device, and
the sensing device includes an image-capturing device;
predicting a second location and a second posture of the mobile object based on the first information, wherein
the second location and the second posture correspond to a second time instant, and
the second time instant is subsequent to the first time instant;
predicting a position and a location of a disturbance factor in an image based on the predicted second location of the mobile object at the second time instant, the predicted second posture of the mobile object at the second time instant, and map information,
wherein the image is to be captured by the image-capturing device at the second time instant;
generating, based on the predicted position of the disturbance factor and the predicted location of the disturbance factor in the image, first control prediction information for control of the sensing device; and
transmitting the first control prediction information, wherein the sensing device is controlled at the second time instant based on the first control prediction information.

16. A non-transitory computer-readable medium having stored thereon, computer-executable instructions which, when executed by a processor, cause the processor to execute operations, the operations comprising:
    acquiring first information regarding a first location and a first posture of a mobile object,
    wherein
        the first location and the first posture correspond to a first time instant,
        the mobile object includes a sensing device, and
        the sensing device includes an image-capturing device;
    predicting a second location and a second posture of the mobile object based on the first information, wherein the second location and the second posture correspond to a second time instant, and
        the second time instant is subsequent to the first time instant;
    predicting a position and a location of a disturbance factor in an image based on the predicted second location of the mobile object at the second time instant, the predicted second posture of the mobile object at the second time instant, and map information,
        wherein the image is to be captured by the image-capturing device at the second time instant;
    generating, based on the predicted position of the disturbance factor and the predicted location of the disturbance factor in the image, first control prediction information for control of the sensing device; and
    transmitting the first control prediction information,
        wherein the sensing device is controlled at the second time instant based on the first control prediction information.

* * * * *